US012145369B2

(12) United States Patent
Sahara

(10) Patent No.: US 12,145,369 B2
(45) Date of Patent: Nov. 19, 2024

(54) IMAGE PRINTING APPARATUS, CONTROL METHOD OF IMAGE PRINTING APPARATUS AND PROCESSING APPARATUS

(71) Applicant: CANON KABUSHIKI KAISHA, Tokyo (JP)

(72) Inventor: Akiyoshi Sahara, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 17/868,701

(22) Filed: Jul. 19, 2022

(65) Prior Publication Data

US 2022/0355591 A1 Nov. 10, 2022

Related U.S. Application Data

(63) Continuation of application No. 17/109,736, filed on Dec. 2, 2020, now Pat. No. 11,427,006.

(30) Foreign Application Priority Data

Dec. 13, 2019 (JP) ................................ 2019-225535

(51) Int. Cl.

| | |
|---|---|
| ***B41J 2/175*** | (2006.01) |
| ***B41J 2/14*** | (2006.01) |
| ***B41J 2/18*** | (2006.01) |

(52) U.S. Cl.

CPC ....... *B41J 2/17506* (2013.01); *B41J 2/14024* (2013.01); *B41J 2/18* (2013.01)

(58) Field of Classification Search

CPC ...... B41J 2/17506; B41J 2/14024; B41J 2/18; B41J 2/17509; B41J 2/1752; B41J 29/38; B41J 29/02

See application file for complete search history.

(56) References Cited

U.S. PATENT DOCUMENTS

| | | | | |
|---|---|---|---|---|
| 6,851,797 | B2 * | 2/2005 | Suda .................... | B41J 2/17513 347/85 |
| 9,272,522 | B1 * | 3/2016 | Kosaka ................ | B41J 2/17566 |
| 9,975,340 | B2 | 5/2018 | Karita et al. ......... | B41J 2/16505 |
| 2009/0213159 | A1 | 8/2009 | Aoki et al. ...................... | 347/14 |

(Continued)

FOREIGN PATENT DOCUMENTS

| | | | |
|---|---|---|---|
| CN | 103072380 A | * | 5/2013 |
| JP | 2009-220564 | | 10/2009 |

(Continued)

*Primary Examiner* — Justin Seo
*Assistant Examiner* — Tracey M McMillion
(74) *Attorney, Agent, or Firm* — Venable LLP

(57) ABSTRACT

For appropriate execution of processing depending on a condition in an image printing apparatus, the image printing apparatus includes a mounting unit on which a tank is mountable, a print head, a sub tank which receives ink from the tank and supplies the ink to the print head, and a refilling unit which refills the sub tank with ink from the tank. In a case where a tank mounted on the mounting unit is non-compliant with a predetermined condition, the control unit prevents the refilling unit from refilling the sub tank with ink from the tank. In contrast, in a case where a tank mounted on the mounting unit is compliant with the predetermined condition, the control unit causes the refilling unit to refill the sub tank with ink from the tank.

9 Claims, 20 Drawing Sheets

(56) References Cited

U.S. PATENT DOCUMENTS

| | | | | |
|---|---|---|---|---|
| 2015/0062259 | A1 | 3/2015 | Yamada | B41J 2/17506 |
| 2016/0139537 | A1 | 5/2016 | Kasai et al. | G03G 15/0863 |
| 2017/0197417 | A1 | 7/2017 | Karita et al. | B41J 2/16505 |
| 2019/0009563 | A1 * | 1/2019 | Tokisawa | B41J 2/17596 |

FOREIGN PATENT DOCUMENTS

| | | |
|---|---|---|
| JP | 2015-047793 | 3/2015 |
| JP | 2016-095375 | 5/2016 |
| JP | 2017-047590 | 3/2017 |
| JP | 2017-121784 | 7/2017 |
| JP | 2018-167436 | 11/2018 |

* cited by examiner

IMAGE PRINTING APPARATUS, CONTROL METHOD OF IMAGE PRINTING APPARATUS AND PROCESSING APPARATUS

This application is a continuation of application Ser. No. 17/109,736 filed Dec. 2, 2020, currently pending; and claims priority under 35 U.S.C. § 119 to Japan Application JP 2019-225535 filed in Japan on Dec. 13, 2019; and the contents of all of which are incorporated herein by reference as if set forth in full.

BACKGROUND OF THE INVENTION

Field of the Invention

The present invention relates to an image printing apparatus to which a cartridge storing a consumable is removably attachable and a control method of the image printing apparatus.

Description of the Related Art

In an image printing apparatus equipped with a removable cartridge storing a coloring material as a consumable, a user can replace a cartridge whose coloring material has been consumed with a new cartridge.

Japanese Patent Laid-Open No. 2017-121784 discloses a printing apparatus in which a buffer tank for receiving ink is provided between a replaceable main tank (cartridge) and a print head and print operation is performed while circulating ink between the buffer tank and the print head. According to Japanese Patent Laid-Open No. 2017-121784, the buffer tank is refilled with ink from the main tank at a preparatory stage before receipt of a print operation command in order to minimize a time from the issuance of a print command to the completion of print operation.

In Japanese Patent Laid-Open No. 2017-121784, there is a possibility that a specific main tank whose use is permitted only in a printing apparatus under a contract is substantially usable irrespective of a conclusion state of the contract. Although the presence/absence of a predetermined contract is described here as an example, such a situation may occur also in the case of setting some kind of use condition for a printing apparatus.

SUMMARY OF THE INVENTION

The present invention has been accomplished in order to solve the above problem. Therefore, the object of the present invention is to realize appropriate execution of processing depending on a predetermined use condition in an image printing apparatus.

In a first aspect of the present invention, there is provided An image printing apparatus comprising: a mounting unit on which a tank storing ink is mountable; a print head configured to eject ink based on print data; a sub tank configured to receive ink from the tank and supply the ink to the print head; a refilling unit configured to refill the sub tank with ink from a tank mounted on the mounting unit; and a control unit configured to control the refilling unit, wherein in a case where a tank mounted on the mounting unit is noncompliant with a predetermined condition, the control unit prevents the refilling unit from refilling the sub tank with ink from the tank, and in a case where a tank mounted on the mounting unit is compliant with the predetermined condition, the control unit causes the refilling unit to refill the sub tank with ink from the tank.

In a second aspect of the present invention, there is provided a control method of an image printing apparatus, the image printing apparatus comprising: a mounting unit on which a tank storing ink is mountable; a print head configured to eject ink based on print data; a sub tank configured to receive ink from the tank and supply the ink to the print head; and a refilling unit configured to refill the sub tank with ink from a tank mounted on the mounting unit, the control method comprising: in a case where a tank mounted on the mounting unit is noncompliant with a predetermined condition, preventing the refilling unit from refilling the sub tank with ink from the tank; and in a case where a tank mounted on the mounting unit is compliant with the predetermined condition, causing the refilling unit to refill the sub tank with ink from the tank.

In a third aspect of the present invention, there is provided A processing apparatus comprising: a mounting unit on which a tank storing a consumable is mountable; a processing unit configured to perform predetermined processing using the consumable; a sub tank configured to receive a consumable from the tank and supply the consumable to the processing unit; a refilling unit configured to refill the sub tank with a consumable from a tank mounted on the mounting unit; and a control unit configured to control the refilling unit, wherein in a case where a tank mounted on the mounting unit is noncompliant with a predetermined condition, the control unit prevents the refilling unit from refilling the sub tank with a consumable from the tank, and in a case where a tank mounted on the mounting unit is compliant with the predetermined condition, the control unit causes the refilling unit to refill the sub tank with a consumable from the tank.

Further features of the present invention will become apparent from the following description of exemplary embodiments with reference to the attached drawings.

DESCRIPTION OF THE EMBODIMENTS

First Embodiment

Figure 1:
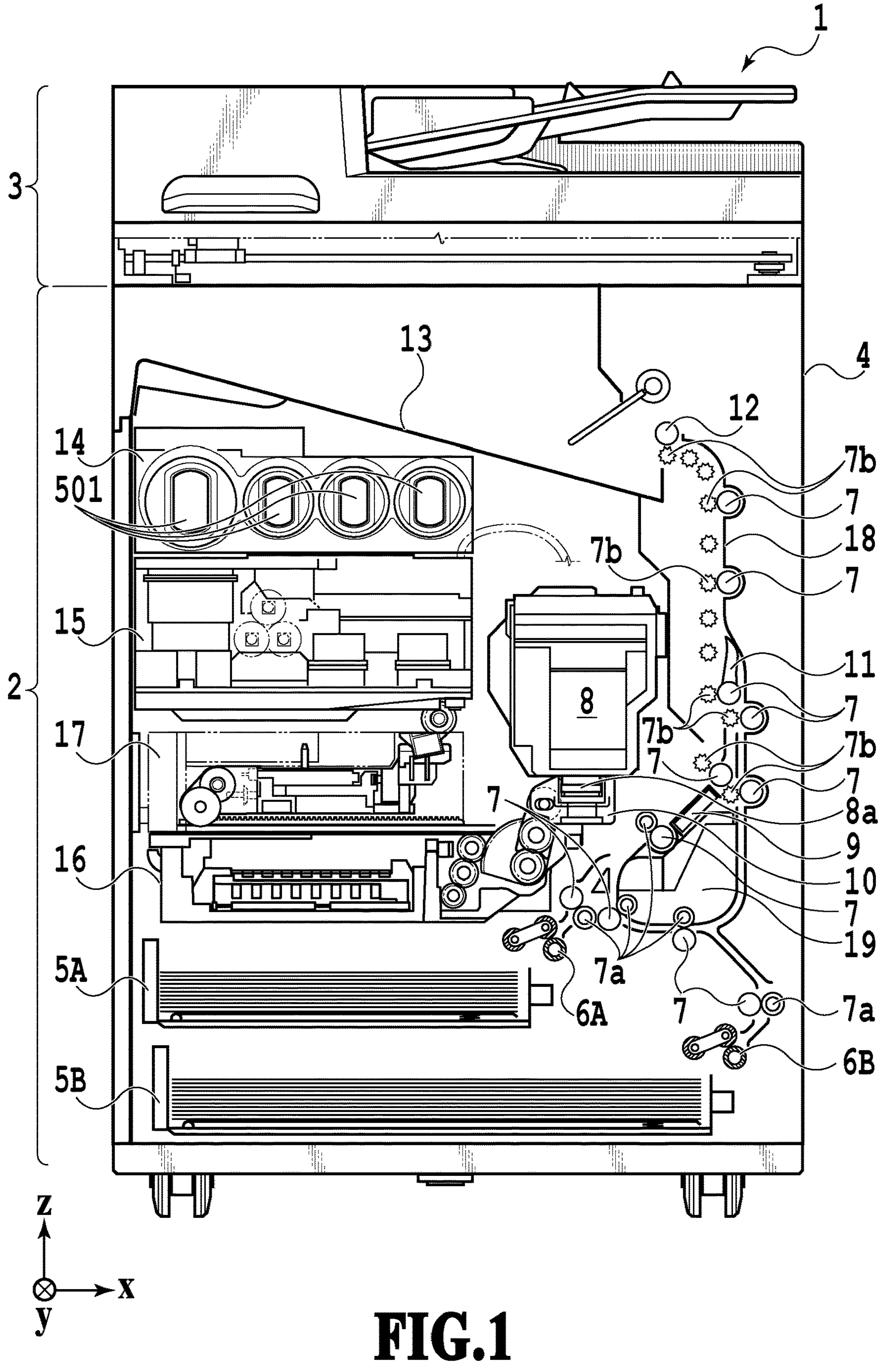
FIG. 1 is an internal configuration diagram of an inkjet printing apparatus.

FIG. 1 is an internal configuration diagram of an inkjet printing apparatus (hereinafter "printing apparatus") 1 of the present embodiment. In the drawings, an x-direction is a horizontal direction, a y-direction (a direction perpendicular to paper) is a direction in which ejection openings are arrayed in a print head 8 described later, and a z-direction is a vertical direction.

The printing apparatus 1 is a multifunction printer comprising a print unit 2 and a scanner unit 3. The printing apparatus 1 can use the print unit 2 and the scanner unit 3 separately or in synchronization to perform various processes related to print operation and scan operation. The scanner unit 3 comprises an automatic document feeder (ADF) and a flatbed scanner (FBS) and is capable of scanning a document automatically fed by the ADF as well as scanning a document placed by a user on a document plate of the FBS. The present embodiment is directed to the multifunction printer comprising both the print unit 2 and the scanner unit 3, but the scanner unit 3 may be omitted. FIG. 1 shows the printing apparatus 1 in a standby state in which neither print operation nor scan operation is performed.

In the print unit 2, a first cassette 5A and a second cassette 5B for housing print medium (cut sheets) S are detachably provided at the bottom of a casing 4 in the vertical direction. Relatively small print medium of up to A4 size are stacked and housed in the first cassette 5A and relatively large print medium of up to A3 size are stacked and hosed in the second cassette 5B. A first feeding unit 6A for feeding housed print medium one by one is provided near the first cassette 5A. Similarly, a second feeding unit 6B is provided near the second cassette 5B. In print operation, a print medium S is selectively fed from either one of the cassettes.

Conveying rollers 7, a discharging roller 12, pinch rollers 7*a*, spurs 7*b*, a guide 18, an inner guide 19, and a flapper 11 are conveying mechanisms for guiding a print medium S in a predetermined direction. The conveying rollers 7 are drive rollers located upstream and downstream of the print head 8 and driven by a conveying motor (not shown). The pinch rollers 7*a* are follower rollers that are provided upstream of the print head 8 and turned while nipping a print medium S together with the conveying rollers 7. The discharging roller 12 is a drive roller located in the most downstream part of the conveying path and driven by the conveying motor (not shown). The spurs 7*b* are provided downstream of the print head 8 and guide a print medium S in a predetermined direction. Some of the spurs 7*b* are located to face the conveying rollers 7 or the discharging roller 12 and nip and convey a print medium S together with the conveying rollers 7 or the discharging roller 12.

The guide 18 is provided in a conveying path of a print medium S to guide the print medium S in a predetermined direction. The inner guide 19 is a member extending in the y-direction. The inner guide 19 has a curved side surface and guides a print medium S along the side surface. The flapper 11 is a member for changing a direction in which a print medium S is conveyed in duplex print operation. A discharging tray 13 is a tray for stacking and housing print medium S that were subjected to print operation and discharged by the discharging roller 12.

The print head 8 of the present embodiment is a full line type color inkjet print head (line head). In the print head 8, a plurality of ejection openings configured to eject ink based on print data are arrayed in the y-direction in FIG. 1 so as to correspond to the width of a print medium S. When the print head 8 is in a standby position shown in FIG. 1, an ejection opening surface 8*a* of the print head 8 is capped with a cap unit 10. This position of the cap unit 10 is also referred to as a capping position. In a case where the print head 8 performs print operation, the orientation of the print head 8 is changed by a print controller 202 described later such that the ejection opening surface 8*a* faces a platen 9. The platen 9 includes a flat plate extending in the y-direction and supports a print medium S being subjected to print operation by the print head 8 from the back side. The movement of the print head 8 from the standby position to a printing position will be described later in detail.

Four main tanks 501 (cartridges) which store black, cyan, magenta, and yellow inks, respectively, are removably mounted on an ink tank unit 14. An ink supply unit 15 is provided in the midstream of a flow path connecting the main tanks 501 to the print head 8 to adjust the pressure and flow rate of ink in the print head 8 within a suitable range. The present embodiment adopts a circulation type ink supply system, where the ink supply unit 15 adjusts the pressure of ink supplied to the print head 8 and the flow rate of ink collected from the print head 8 within a suitable range.

A maintenance unit 16 comprises the cap unit 10 and a wiping unit 17 and activates them at predetermined timings to perform maintenance operation for the print head 8. The maintenance unit 16 will be described later in detail.

Figure 2:
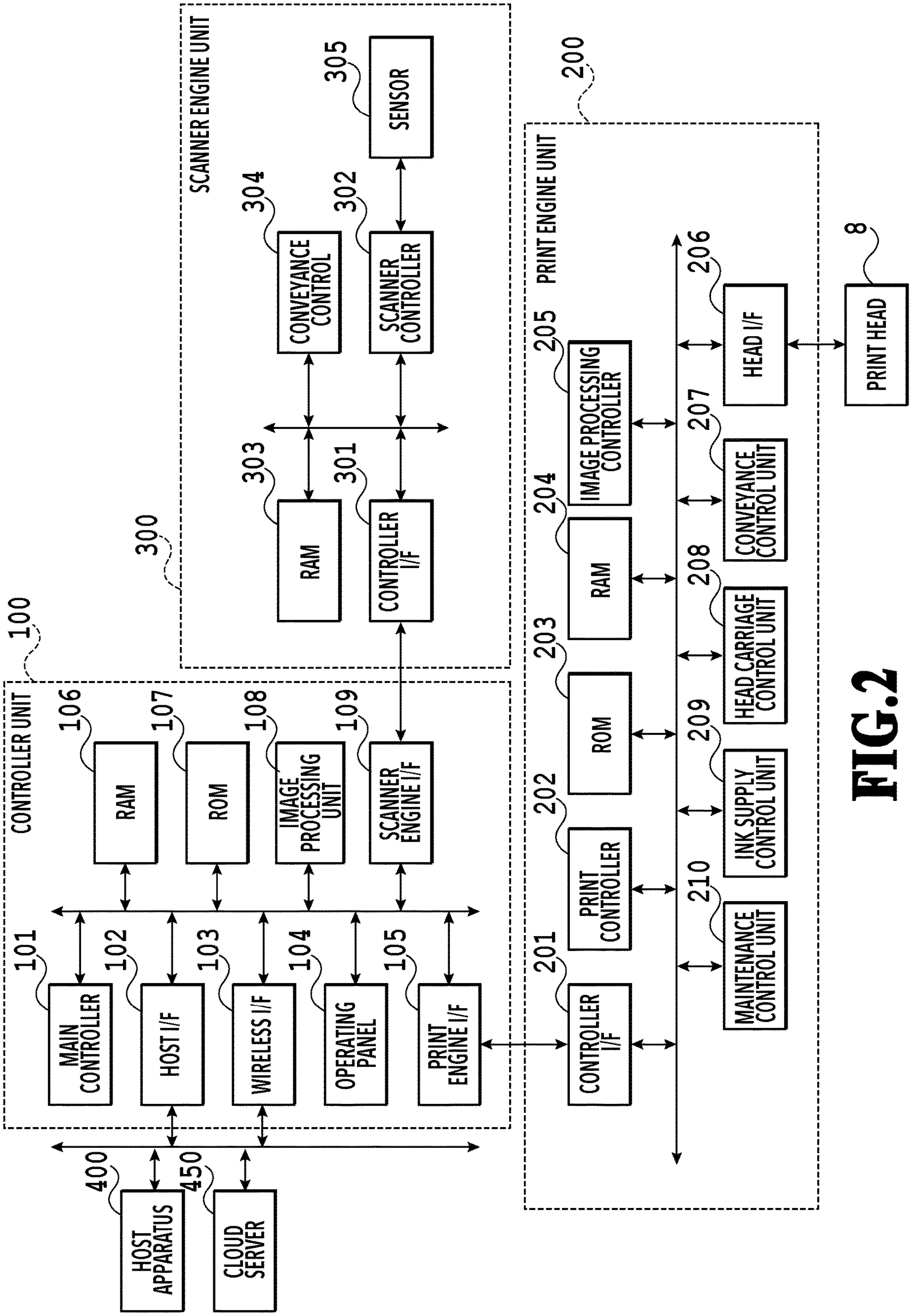
FIG. 2 is a block diagram showing a control configuration in the printing apparatus.

FIG. 2 is a block diagram showing a control configuration in the printing apparatus 1. The control configuration mainly includes a print engine unit 200 that exercises control over the print unit 2, a scanner engine unit 300 that exercises control over the scanner unit 3, and a controller unit 100 that exercises control over the entire printing apparatus 1. A print controller 202 controls various mechanisms of the print engine unit 200 under instructions from a main controller 101 of the controller unit 100. Various mechanisms of the scanner engine unit 300 are controlled by the main controller 101 of the controller unit 100. The control configuration will be described below in detail.

In the controller unit 100, the main controller 101 including a CPU controls the entire printing apparatus 1 using a RAM 106 as a work area in accordance with various parameters and programs stored in a ROM 107. For example, when a print job is input from a host apparatus 400 via a host I/F 102 or a wireless I/F 103, an image processing unit 108 executes predetermined image processing for received image data to be printed under instructions from the main controller 101. The main controller 101 transmits the image data subjected to the image processing to the print engine unit 200 via a print engine I/F 105. For example, when a scan command is input from the host apparatus 400, the main controller 101 transmits the command to the scanner unit 3 via a scanner engine I/F 109.

The printing apparatus 1 may acquire image data from the host apparatus 400 via a wireless or wired communication or acquire image data from an external storage unit (such as a USB memory) connected to the printing apparatus 1. A communication system used for the wireless or wired communication is not limited. For example, as a communication system for the wireless communication, Wi-Fi (Wireless Fidelity; registered trademark) and Bluetooth (registered trademark) can be used. As a communication system for the wired communication, a USB (Universal Serial Bus) and the like can be used.

An operating panel 104 is a mechanism to allow a user to do input and output for the printing apparatus 1. A user can give an instruction to perform operation such as copying and scanning, set a print mode, and recognize information about the printing apparatus 1 via the operating panel 104.

The main controller 101 is connected to a cloud server 450 via the host I/F 102 or the wireless I/F 103. The cloud server 450 manages use contract information associated with an ID of the printing apparatus 1 or the like. The main controller 101 can read the use contract information from the cloud server 450 and control the operation of the printing apparatus 1 based on the read information.

In the print engine unit 200, the print controller 202 including a CPU controls various mechanisms of the print unit 2 using a RAM 204 as a work area in accordance with various parameters and programs stored in a ROM 203. When various commands and image data are received via a controller I/F 201, the print controller (control unit) 202 temporarily stores them in the RAM 204. The print controller 202 allows an image processing controller 205 to convert the stored image data into print data such that the print head 8 can use it for print operation.

After the generation of the print data, the print controller 202 allows the print head 8 to perform print operation based on the print data via a head I/F 206. At this time, the print controller 202 conveys a print medium S by driving the first feeding unit 6A, second feeding unit 6B, conveying rollers 7, discharging roller 12, and flapper 11 shown in FIG. 1 via a conveyance control unit 207. The print head 8 performs print operation in synchronization with the conveyance operation of the print medium S under instructions from the print controller 202, thereby performing printing.

A head carriage control unit 208 changes the orientation and position of the print head 8 in accordance with an operating state of the printing apparatus 1 such as a maintenance state or a printing state. An ink supply control unit 209 controls ink supply from the main tanks 501 to the ink supply unit 15. The ink supply control unit 209 also controls the ink supply unit 15 such that the pressure of ink supplied to the print head 8 is within a suitable range. A maintenance control unit 210 controls the operation of the cap unit 10 and wiping unit 17 in the maintenance unit 16 when performing maintenance operation for the print head 8.

In the scanner engine unit 300, the main controller 101 controls hardware resources of the scanner controller 302 using the RAM 106 as a work area in accordance with various parameters and programs stored in the ROM 107, thereby controlling various mechanisms of the scanner unit 3. For example, the main controller 101 controls hardware resources in the scanner controller 302 via a controller I/F 301 to cause a conveyance control unit 304 to convey a document placed by a user on the ADF and cause a sensor 305 to scan the document. The scanner controller 302 stores scanned image data in a RAM 303. The print controller 202 can convert the image data acquired as described above into print data to enable the print head 8 to perform print operation based on the image data scanned by the scanner controller 302.

Figure 3:
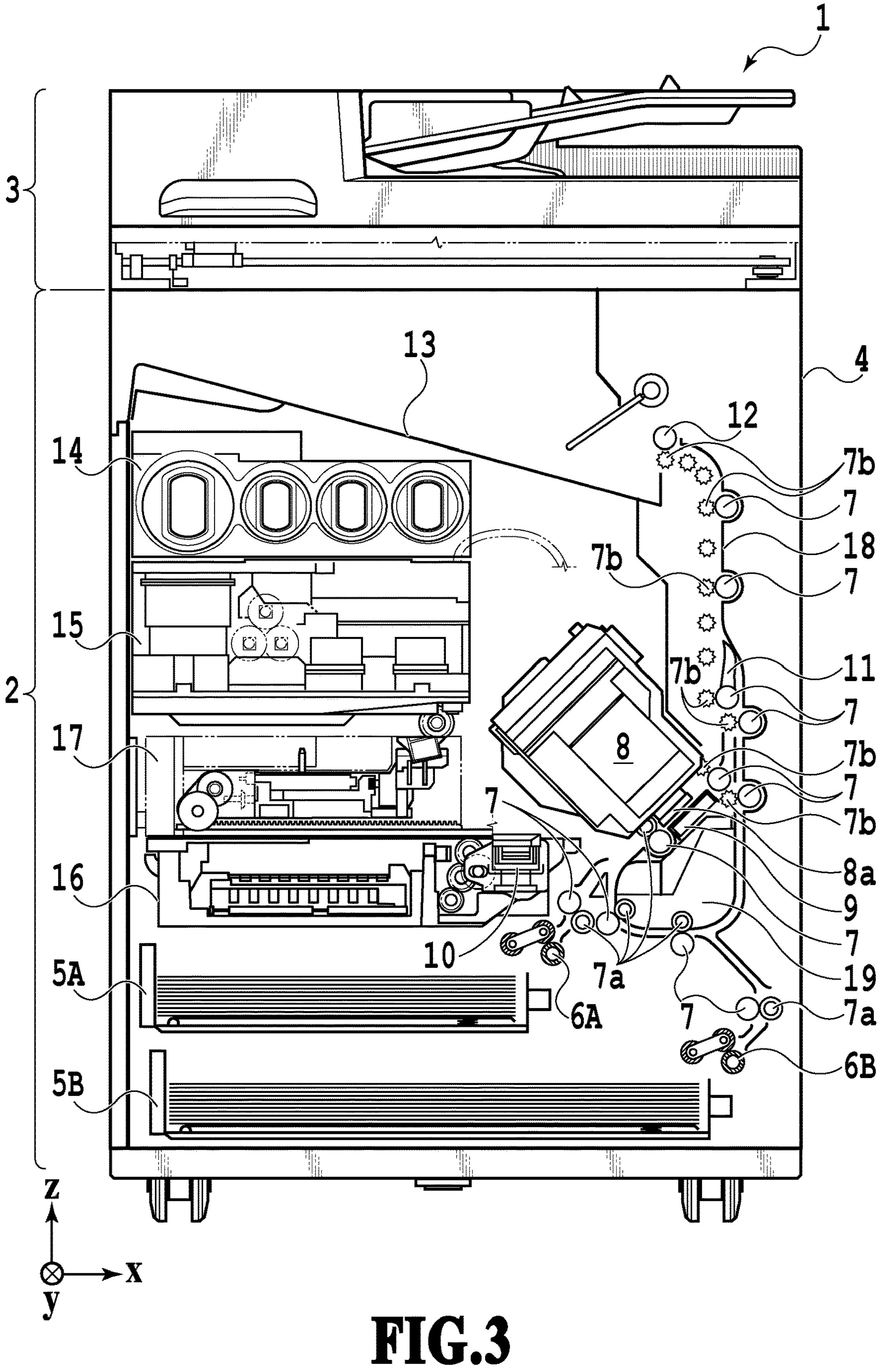
FIG. 3 shows the printing apparatus in a printing state.

FIG. 3 shows the printing apparatus 1 in a printing state. As compared with the standby state shown in FIG. 1, the cap unit 10 is separated from the ejection opening surface 8*a* of the print head 8 and the ejection opening surface 8*a* faces the platen 9. In the present embodiment, the plane of the platen 9 is inclined about 45° with respect to the horizontal plane. The ejection opening surface 8*a* of the print head 8 in a printing position is also inclined about 45° with respect to the horizontal plane so as to keep a constant distance from the platen 9.

In the case of moving the print head 8 from the standby position shown in FIG. 1 to the printing position shown in FIG. 3, the print controller 202 uses the maintenance control unit 210 to move the cap unit 10 down to an evacuation position shown in FIG. 3, thereby separating the cap member 10*a* from the ejection opening surface 8*a* of the print head 8. The print controller 202 then uses the head carriage control unit 208 to turn the print head 8 45° while lowering the vertical height of the print head 8 such that the ejection opening surface 8*a* faces the platen 9. After the completion of print operation, the print controller 202 reverses the above procedure to move the print head 8 from the printing position to the standby position.

Next, a conveying path of a print medium S in the print unit 2 will be described. When a print command is input, the print controller 202 first uses the maintenance control unit 210 and the head carriage control unit 208 to move the print head 8 to the printing position shown in FIG. 3. The print controller 202 then uses the conveyance control unit 207 to drive either the first feeding unit 6A or the second feeding unit 6B in accordance with the print command and feed a print medium S.

Figure 4C:
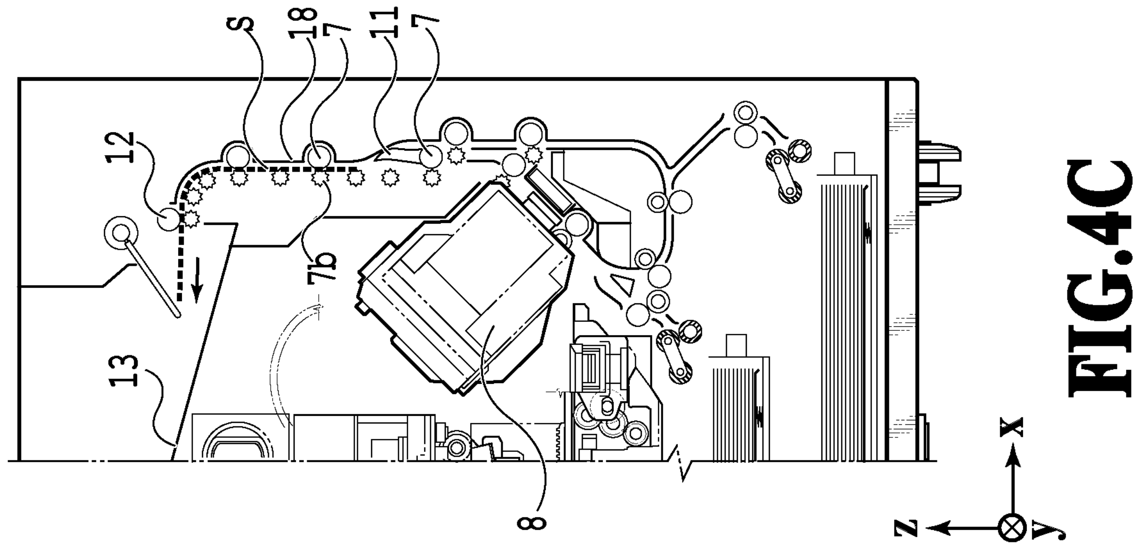
FIGS. 4A to 4C are diagrams showing a conveying path in the case of feeding a print medium.
Figure 4B:
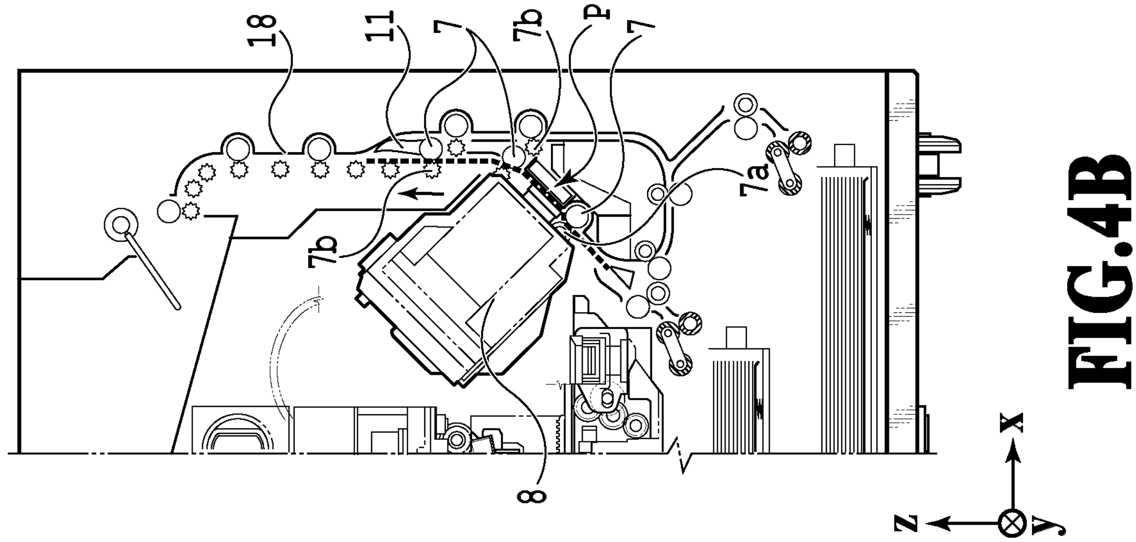
Figure 4A:
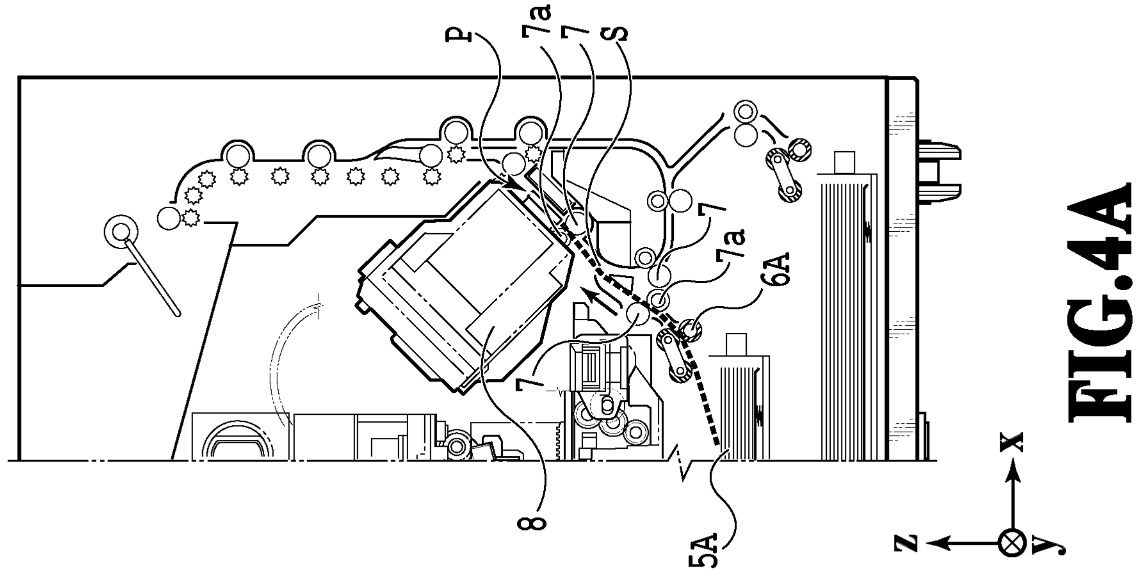

FIGS. 4A to 4C are diagrams showing a conveying path in the case of feeding an A4 size print medium S from the first cassette 5A. In FIGS. 4A to 4C and the subsequent drawings, a print medium S being conveyed is shown by a dashed line. A print medium S at the top of a stack of print medium in the first cassette 5A is separated from the rest of the stack by the first feeding unit 6A and conveyed toward a print area P between the platen 9 and the print head 8 while being nipped between the conveying rollers 7 and the pinch rollers 7*a*. FIG. 4A shows a conveying state where the front end of the print medium S is about to reach the print area P. The direction of movement of the print medium S is changed from the horizontal direction (x-direction) to a direction inclined about 45° with respect to the horizontal direction while being fed by the first feeding unit 6A to reach the print area P.

In the print area P, a plurality of ejection openings provided in the print head 8 eject ink toward the print medium S. In an area where ink is applied to the print medium S, the back side of the print medium S is supported by the platen 9 so as to keep a constant distance between the ejection opening surface 8*a* and the print medium S. After ink is applied to the print medium S, the discharging roller 12 and the spur 7*b* guide the print medium S such that the print medium S passes on the left of the flapper 11 with its tip inclined to the right in FIG. 4A and is conveyed along the guide 18 in the vertically upward direction of the printing apparatus 1. FIG. 4B shows a state where the front end of the print medium S has passed through the print area P and the print medium S is being conveyed vertically upward. The direction of movement of the print medium S is changed to the vertically upward direction by the conveying rollers 7 and the spurs 7*b* after passing through the print area P inclined about 45° with respect to the horizontal direction.

After being conveyed vertically upward, the print medium S is discharged into the discharging tray 13 by the discharging roller 12 and the spurs 7*b*. FIG. 4C shows a state where the front end of the print medium S is being discharged into the discharging tray 13. The print medium S is discharged with the side on which an image was printed by the print head 8 down and held in the discharging tray 13.

Figure 5A:
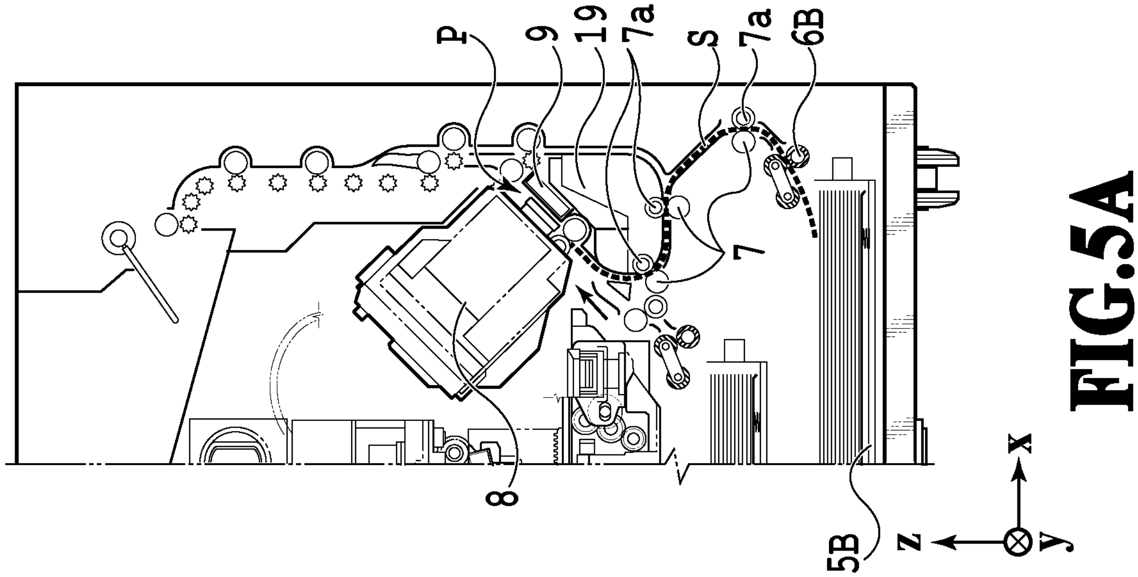
FIGS. 5A to 5C are diagrams showing a conveying path in the case of feeding a print medium.
Figure 5B:
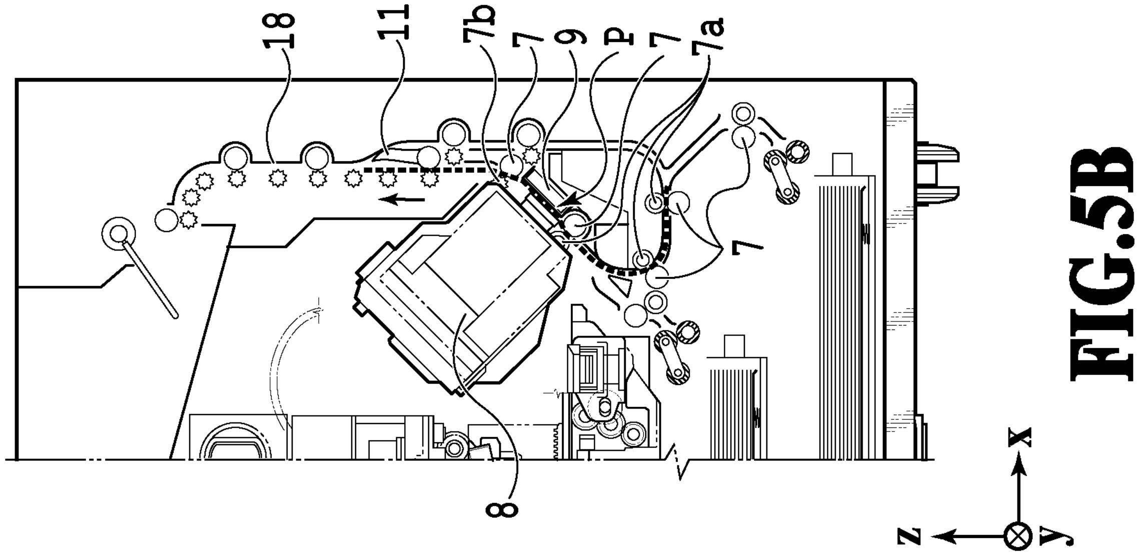
Figure 5C:
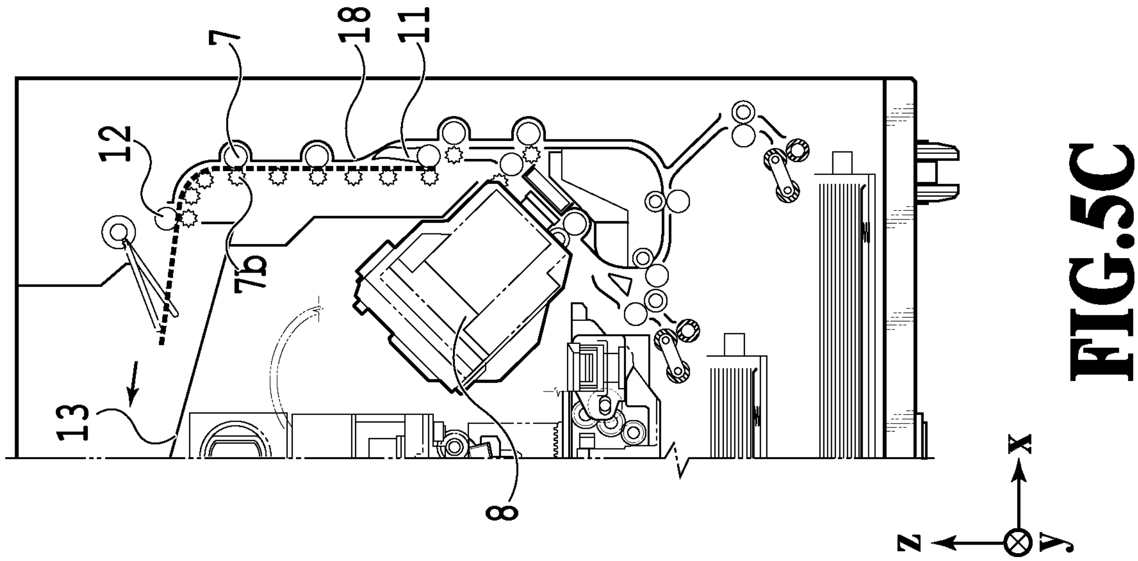

FIGS. 5A to 5C are diagrams showing a conveying path in the case of feeding an A3 size print medium S from the second cassette 5B. A print medium S at the top of a stack of print medium in the second cassette 5B is separated from the rest of the stack by the second feeding unit 6B and conveyed toward the print area P between the platen 9 and the print head 8 while being nipped between the conveying rollers 7 and the pinch rollers 7*a*.

FIG. 5A shows a conveying state where the front end of the print medium S is about to reach the print area P. In a part of the conveying path, through which the print medium S is fed by the second feeding unit 6B toward the print area P, the plurality of conveying rollers 7, the plurality of pinch rollers 7*a*, and the inner guide 19 are provided such that the print medium S is conveyed to the platen 9 while being bent into an S-shape.

The rest of the conveying path is the same as that in the case of the A4 size print medium S shown in FIGS. 4B and 4C. FIG. 5B shows a state where the front end of the print medium S has passed through the print area P and the print medium S is being conveyed vertically upward. FIG. 5C shows a state where the front end of the print medium S is being discharged into the discharging tray 13.

FIGS. 6A to 6D show a conveying path in the case of performing print operation (duplex printing) for the back side (second side) of an A4 size print medium S. In a case where the printing apparatus 1 performs duplex printing, print operation is first performed for the first side (front side) and then performed for the second side (back side). A conveying procedure during print operation for the first side is the same as that shown in FIGS. 4A to 4C and therefore description will be omitted. A conveying procedure subsequent to FIG. 4C will be described below.

Figure 6D:
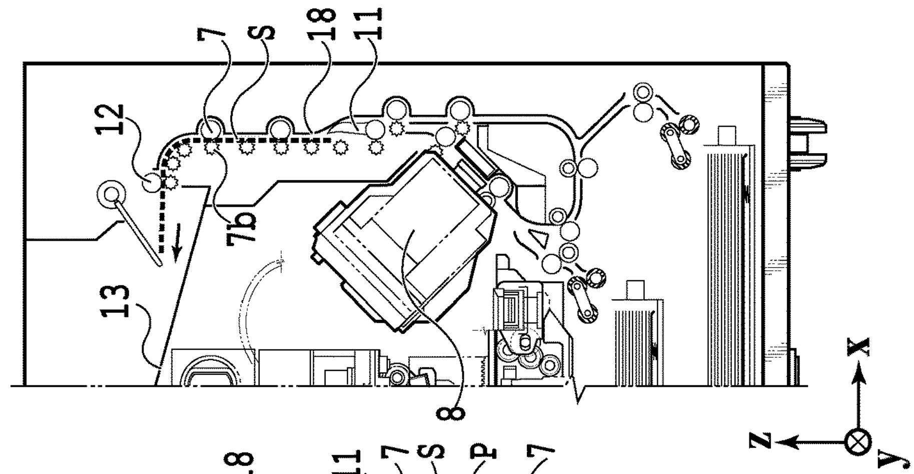
FIGS. 6A to 6D are diagrams showing a conveying path in the case of feeding a print medium.
Figure 6C:
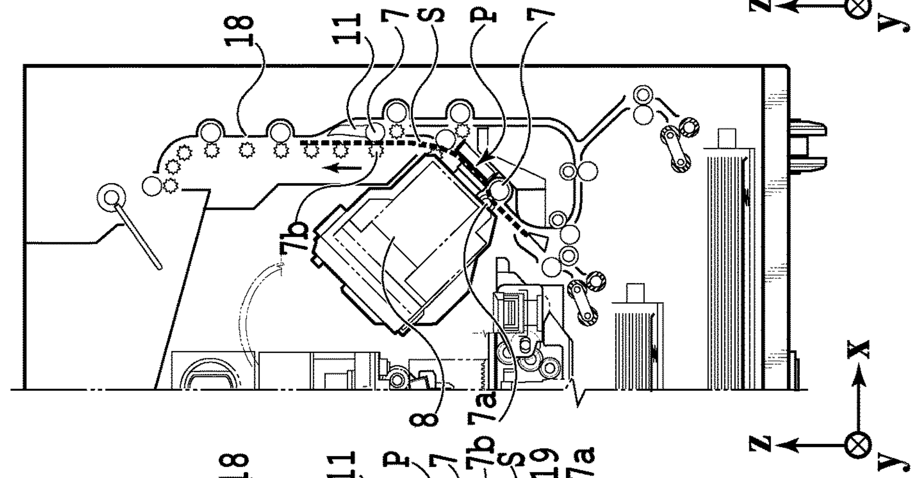
Figure 6B:
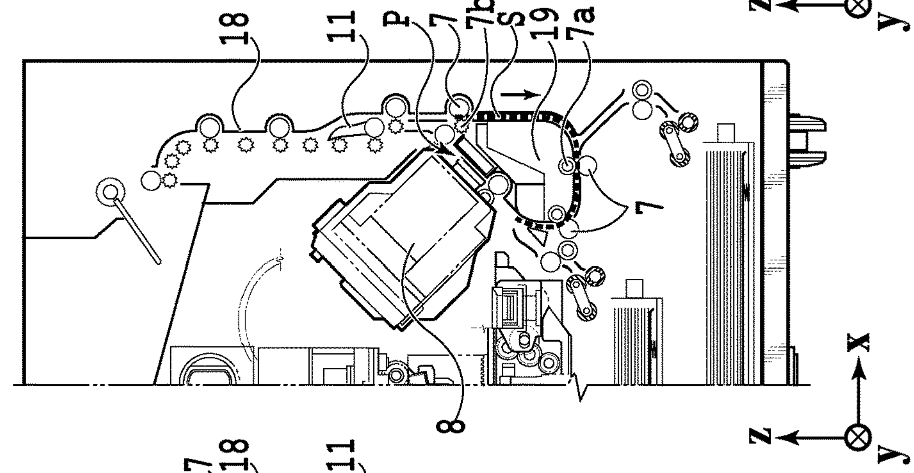
Figure 6A:
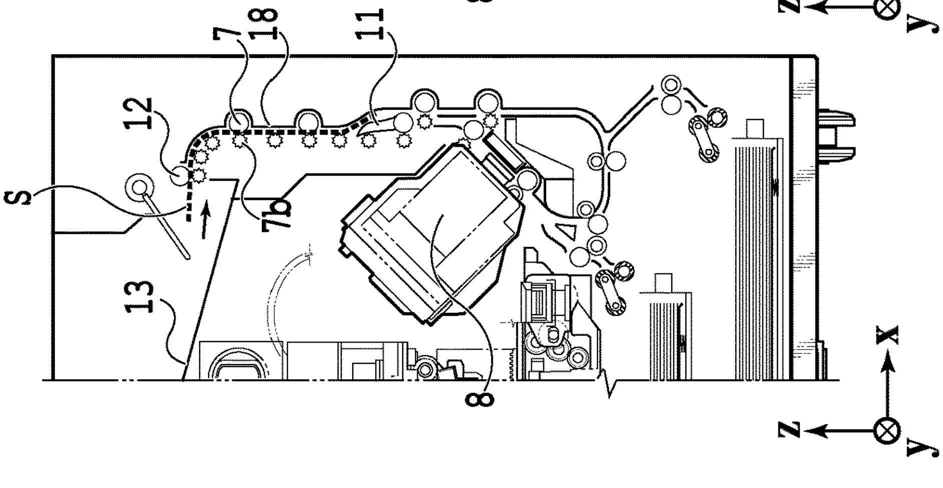

After the print head 8 finishes print operation for the first side and the back end of the print medium S passes by the flapper 11, the print controller 202 turns the conveying rollers 7 backward to convey the print medium S into the printing apparatus 1. At this time, since the flapper 11 is controlled by an actuator (not shown) such that the tip of the flapper 11 is inclined to the left in FIG. 6, the front end of the print medium S (corresponding to the back end during the print operation for the first side) passes on the right of the flapper 11 and is conveyed vertically downward. FIG. 6A shows a state where the front end of the print medium S (corresponding to the back end during the print operation for the first side) is passing on the right of the flapper 11.

Then, the print medium S is conveyed along the curved outer surface of the inner guide 19 and then conveyed again to the print area P between the print head 8 and the platen 9. At this time, the second side of the print medium S faces the ejection opening surface 8*a* of the print head 8. FIG. 6B shows a conveying state where the front end of the print medium S is about to reach the print area P for print operation for the second side.

The rest of the conveying path is the same as that in the case of the print operation for the first side shown in FIGS. 4B and 4C. FIG. 6C shows a state where the front end of the print medium S has passed through the print area P and the print medium S is being conveyed vertically upward. At this time, the flapper 11 is controlled by the actuator (not shown) such that the tip of the flapper 11 is inclined to the right. FIG. 6D shows a state where the front end of the print medium S has passed through the discharging roller 12 and the print medium S is being discharged into the discharging tray 13. The same conveyance is performed also in duplex printing of an A3 size print medium S.

Next, maintenance operation for the print head 8 will be described. As described with reference to FIG. 1, the maintenance unit 16 comprises the cap unit 10 and the wiping unit 17 and activates them at predetermined timings to perform maintenance operation.

Figure 7:
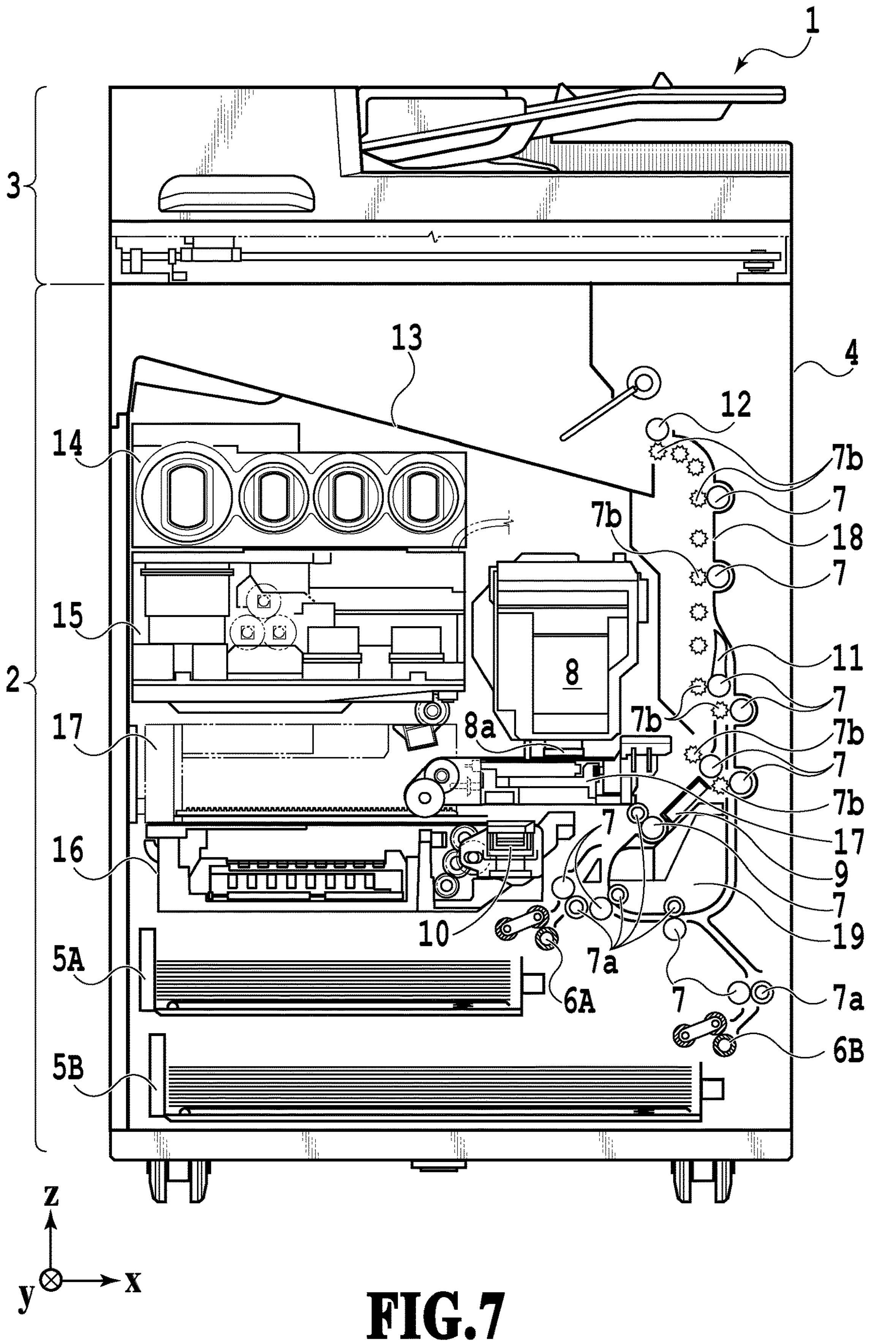
FIG. 7 is a diagram showing the printing apparatus in a maintenance state.

FIG. 7 is a diagram showing the printing apparatus 1 in a maintenance state. In the case of moving the print head 8 from the standby position shown in FIG. 1 to a maintenance position shown in FIG. 7, the print controller 202 first moves the print head 8 diagonally upward in the vertical direction and moves the cap unit 10 vertically downward. The print controller 202 then moves the wiping unit 17 from the evacuation position to the right in FIG. 7. After that, the print controller 202 moves the print head 8 vertically downward to the maintenance position where maintenance operation can be performed.

On the other hand, in the case of moving the print head 8 from the printing position shown in FIG. 3 to the maintenance position shown in FIG. 7, the print controller 202 first moves the print head 8 vertically upward while turning it about 45°. The print controller 202 then moves the wiping unit 17 from the evacuation position to the right. Following that, the print controller 202 moves the print head 8 vertically downward to the maintenance position where maintenance operation can be performed by the maintenance unit 16.

Figure 8A:
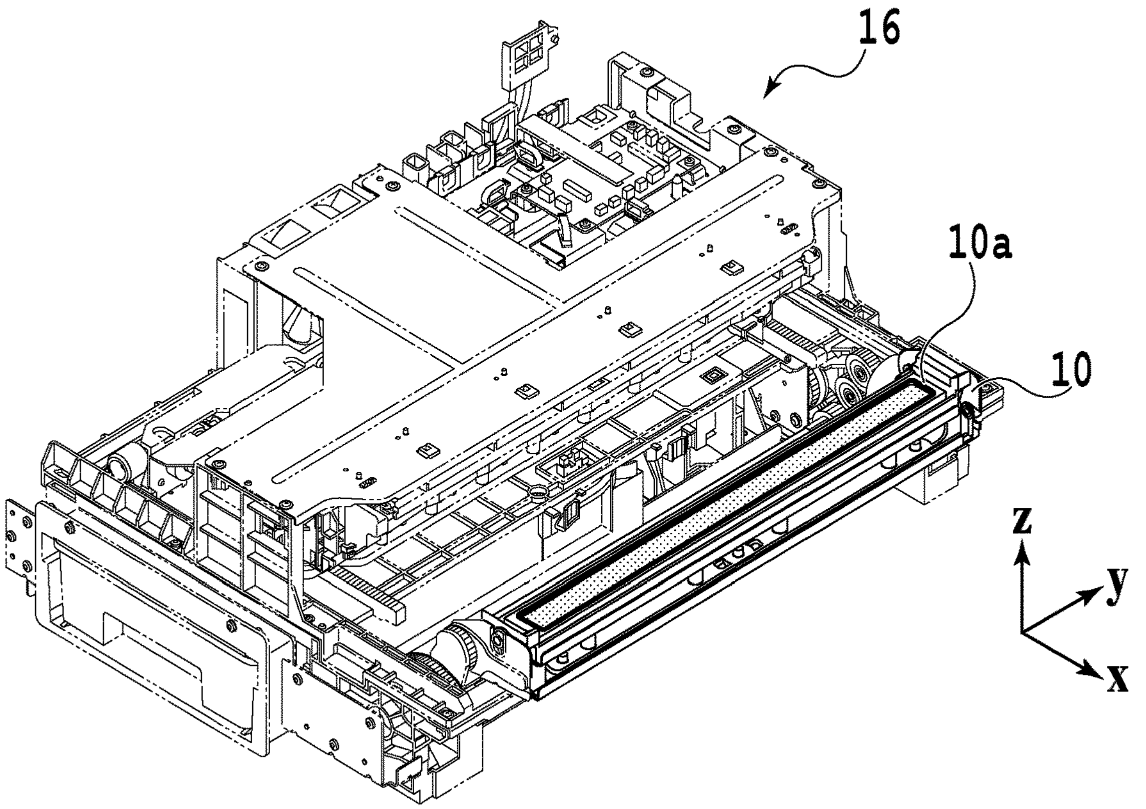
FIGS. 8A and 8B are diagrams showing a maintenance unit.
Figure 8B:
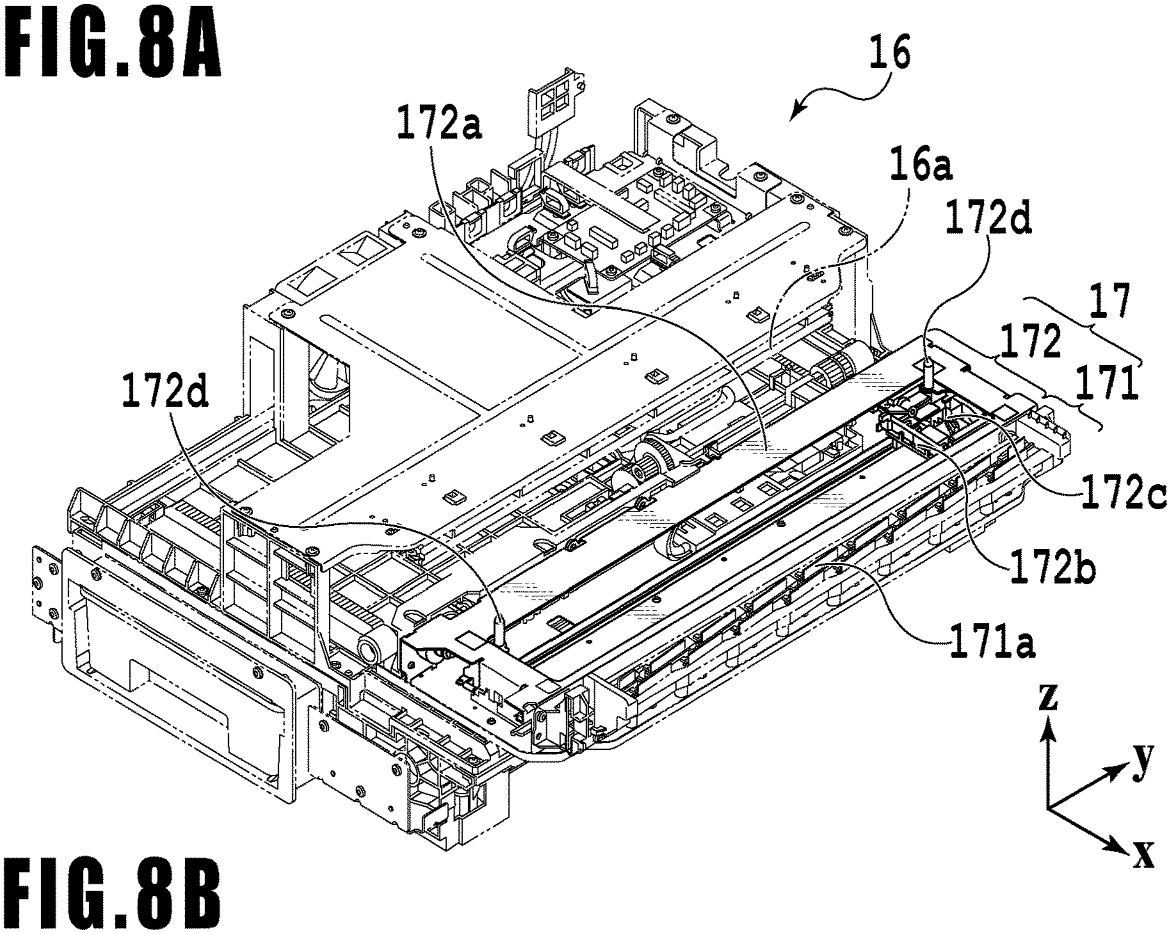

FIG. 8A is a perspective view showing the maintenance unit 16 in a standby position. FIG. 8B is a perspective view showing the maintenance unit 16 in the maintenance position. FIG. 8A corresponds to the position of the maintenance unit 16 shown in FIG. 1 and FIG. 8B corresponds to the position of the maintenance unit 16 shown in FIG. 7. When the print head 8 is in the standby position, the maintenance unit 16 is in the standby position shown in FIG. 8A, the cap unit 10 is in the capping position, and the wiping unit 17 is housed in the maintenance unit 16. The cap unit 10 comprises a box-shaped cap member 10*a* extending in the y-direction. The cap member 10*a* can be brought into intimate contact with the ejection opening surface 8*a* of the print head 8 to prevent ink from evaporating from the ejection openings. The cap unit 10 also has the function of collecting ink ejected to the cap member 10*a* for preliminary ejection or the like and allowing a suction pump (not shown) to suck the collected ink.

On the other hand, in the maintenance position shown in FIG. 8B, the cap unit 10 has been moved to the vertically downward evacuation position and the wiping unit 17 has been drawn from the maintenance unit 16. The wiping unit 17 comprises two wiper units: a blade wiper unit 171 and a vacuum wiper unit 172.

In the blade wiper unit 171, blade wipers 171*a* for wiping the ejection opening surface 8*a* in the x-direction are provided in the y-direction along the length of an area where the ejection openings are arrayed. In the case of performing wiping operation by the use of the blade wiper unit 171, the wiping unit 17 moves the blade wiper unit 171 in the x-direction while the print head 8 is positioned at a height at which the print head 8 can be in contact with the blade wipers 171*a*. This movement enables the blade wipers 171*a* to wipe ink and the like adhering to the ejection opening surface 8*a*.

The entrance of the maintenance unit 16 through which the blade wipers 171*a* are housed is equipped with a wet wiper cleaner 16*a* for removing ink adhering to the blade wipers 171*a* and applying a wetting liquid to the blade wipers 171*a*. Thus, the wet wiper cleaner 16*a* removes substances adhering to the blade wipers 171*a* and applies the wetting liquid to the blade wipers 171*a* each time the blade wipers 171*a* are inserted into the maintenance unit 16. The wetting liquid is transferred to the ejection opening surface 8*a* in the next wiping operation for the ejection opening surface 8*a*, thereby facilitating sliding between the ejection opening surface 8*a* and the blade wipers 171*a*.

The vacuum wiper unit 172 comprises a flat plate 172*a* having an opening extending in the y-direction, a carriage 172*b* movable in the y-direction within the opening, and a vacuum wiper 172*c* mounted on the carriage 172*b*. The vacuum wiper 172*c* is provided to wipe the ejection opening surface 8*a* in the y-direction along with the movement of the carriage 172*b*. The tip of the vacuum wiper 172*c* has a suction opening connected to the suction pump (not shown). Accordingly, if the carriage 172*b* is moved in the y-direction while operating the suction pump, ink and the like adhering to the ejection opening surface 8*a* of the print head 8 are wiped and gathered by the vacuum wiper 172*c* and sucked into the suction opening. At this time, the flat plate 172*a* and a dowel pin 172*d* provided at both ends of the opening are used to align the ejection opening surface 8*a* with the vacuum wiper 172*c*.

Figure 9:
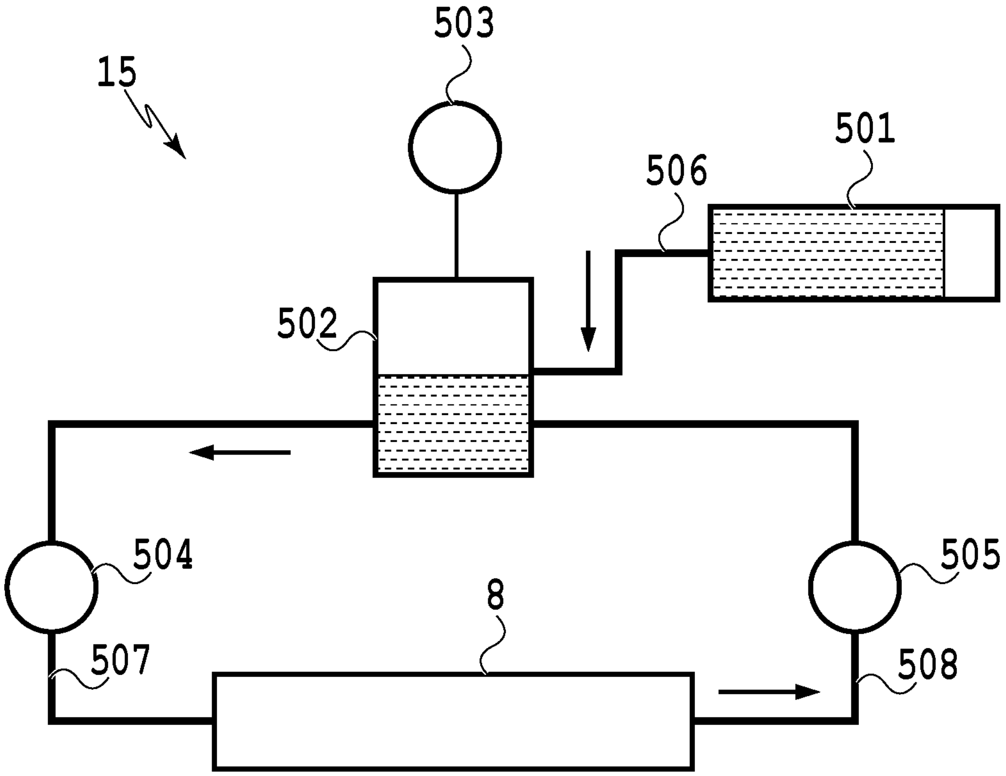
FIG. 9 is a schematic diagram of a configuration of an ink supply unit.

FIG. 9 is a schematic diagram of a configuration of the ink supply unit 15. The ink supply unit 15 has the function of supplying ink from the main tanks 501 mounted on the ink tank unit 14 to the print head 8 while circulating the ink under suitable pressure. Although the configuration for ink of one color is shown here, the printing apparatus 1 has the same configuration for each ink color.

The ink supply unit 15 comprises a sub tank 502, a decompression pump 503, a supply pump 504, a collection pump 505, a connection flow path 506, a supply flow path 507, and a collection flow path 508. The sub tank 502 is a tank for temporarily receiving ink to be supplied to the print head 8 and is connected to the print head 8 via the supply flow path 507 and the collection flow path 508. The supply flow path 507 is equipped with the supply pump 504 for supplying ink received in the sub tank 502 to the print head 8. The collection flow path 508 is equipped with the collection pump 505 for collecting ink not used in the print head 8 into the sub tank 502. Under the above configuration, ink is circulated in the order of the sub tank 502, the supply flow path 507, the print head 8, and the collection flow path 508, and returned to the sub tank 502. During the circulation, the print head 8 ejects ink based on print data.

This ink circulation control enables stable supply of fresh ink to the print head 8. As a result, the ejection operation of the print head 8 can be stabilized and an output image can be kept with a high degree of definition.

The amount of ink received in the sub tank 502 gradually decreases with print operation. Accordingly, in a case where the amount of ink received in the sub tank 502 is less than a predetermined value, the print controller 202 drives the decompression pump 503 at a predetermined timing to decompress the inside of the sub tank 502. The sub tank 502 is thus refilled with ink from the main tank 501 connected via the connection flow path 506. In a case where the amount of ink received in the sub tank 502 is equal to or greater than the predetermined value, the print controller 202 stops the decompression pump 503. The main tank 501 has a flexible container which stores ink and shrinks along with ink consumption. The main tank 501 whose ink has been consumed can be removed from the ink tank unit 14 and replaced with a new main tank 501 by a user.

The print controller 201 appropriately performs the above sub tank refilling processing as a preparatory stage before receiving a print command separately from receipt of a print command. Thus, at the time of issuance of a print command, print operation can be speedily started without refilling operation.

In the present embodiment, the print controller 202 activates the pumps and unshown valves via the ink supply control unit 209 and controls the circulation described above (see FIG. 2). At this time, the print controller 202 controls activation and deactivation of the supply pumps 504 collectively for all the ink colors and controls activation and deactivation of the collection pumps 505 for the respective ink colors. Thus, in the case of printing a color image, all of the four supply pumps 504 and the four collection pumps 505 are activated and inks of all the colors are circulated between the print head 8 and the respective sub tanks 502. In contrast, in the case of printing a monochrome image, the four supply pumps 504 are activated, whereas only one of the collection pumps 505 corresponding to the black ink is activated. Thus, among the inks of all the colors, only the black ink is circulated and the inks of the three other colors are not circulated between the print head 8 and the sub tank 502. However, the control configuration of the supply pumps 504 and the collection pumps 505 is not limited to this configuration, in which inks can be selectively circulated depending on whether printing is color or monochrome.

Here, a brief description will be given of a use contract regarding the printing apparatus 1 of the present embodiment. In the printing apparatus 1 of the present embodiment, a specific contract to expand a usage form is offered. Although the contents of the specific contract are not limited, for example, the contract may enable printing of up to a predetermined number of sheets irrespective of the amount of ink consumption by monthly fixed-price payments. A specific tank whose use is permitted only under the above specific contract and a general tank whose use is permitted without conclusion of the specific contract are available on the market. These tanks are equal in shape and mountable on the ink tank unit 14 of the printing apparatus 1. It is therefore required that the use of the printing apparatus 1 be appropriately offered to a user depending on a conclusion state of the contract.

Figure 10:
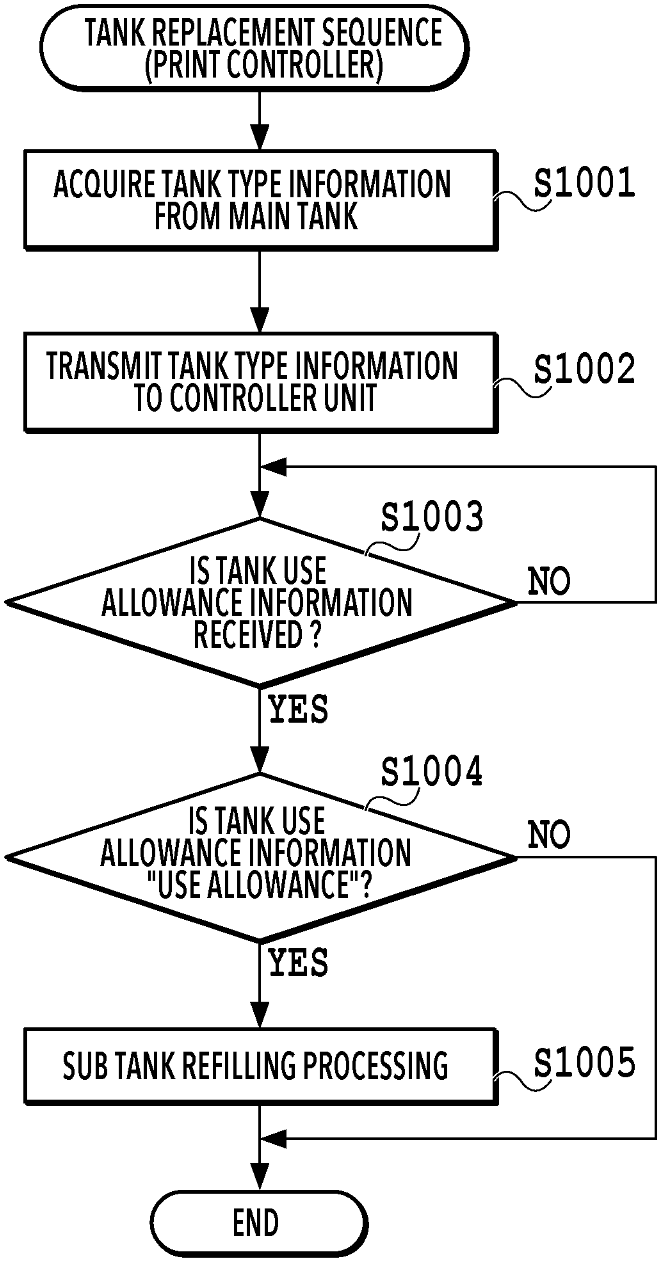
FIG. 10 is a flowchart of a tank replacement sequence.

FIG. 10 is a flowchart showing a tank replacement sequence executed by the print controller 202 of the print engine unit 200. The processing is executed by the print controller 202 using the RAM 204 as a work area in accordance with a program stored in the ROM 203 (see FIG. 2). The sequence is started when mounting of the main tank 501 is detected in the printing apparatus 1. Although the method of detecting mounting of the main tank 501 is not limited, for example, a sensor may be provided on a cover of a mounting unit of the ink tank unit 14 (see FIG. 1) such that the main tank 501 can be determined to be mounted in a case where the sensor detects opening/closing of the cover.

If the processing is started, the print controller 202 first acquires tank type information from a nonvolatile memory attached to each main tank 501 in S1001. As the tank type information, the nonvolatile memory stores information about whether the tank is a specific tank whose use is permitted only under the specific contract or a general tank as well as information about a color of ink stored in the tank.

In S1002, the print controller 202 transmits the tank type information acquired in S1001 to the controller unit 100. More specifically, the print controller 202 transmits, to the controller unit 100, ink color information about each of the four main tanks 501 mounted on the ink tank unit 14 and information about whether each main tank 501 is a specific tank or a general tank. After that, the print controller 202 is on standby until it is determined that tank use allowance information is received in S1003 and proceeds to S1004 if it is determined that the use allowance information is received.

The tank use allowance information is information indicating "use allowance" or "use disallowance" of the currently mounted main tanks 501. The tank use allowance information is generated by the main controller 101 based on the tank type information and transmitted to the print controller 202.

In S1004, the print controller 201 determines which of "use allowance" and "use disallowance" is indicated by the received tank use allowance information. If the tank use allowance information indicates "use disallowance," the print controller 201 finishes the processing without executing sub tank refilling processing.

In contrast, if the tank use allowance information indicates "use allowance," the print controller 202 proceeds to S1005 and executes sub tank refilling processing. More specifically, the print controller 202 drives the decompression pump 503 and causes ink to flow from the main tank 501 to the sub tank 502 until the amount of ink in the sub tank 502 is equal to or greater than a predetermined value (see FIG. 9). The print controller 202 performs the sub tank refilling processing for all the ink colors. The processing is thus finished.

Figure 11:
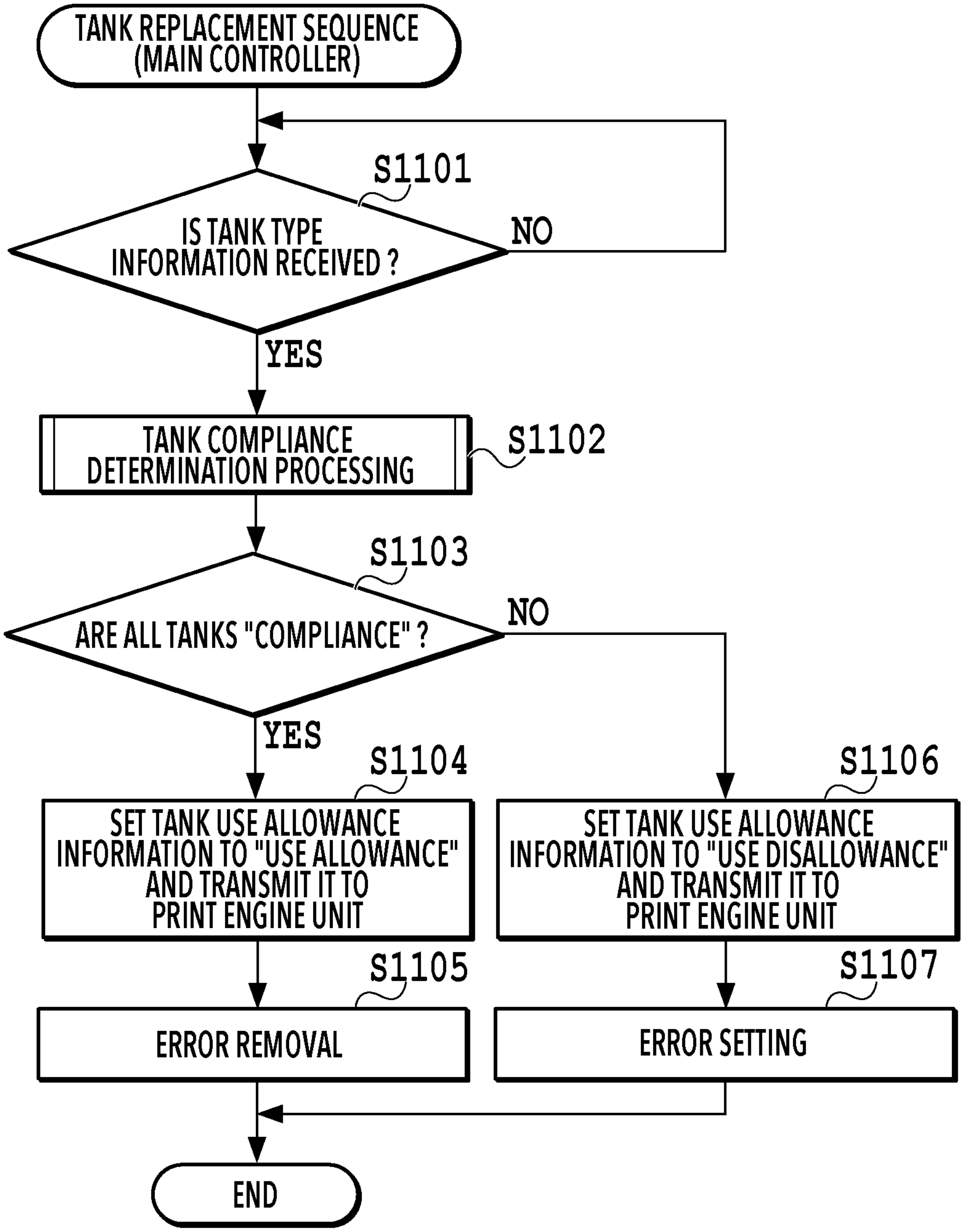
FIG. 11 is a flowchart of a tank replacement sequence.

FIG. 11 is a flowchart showing a tank replacement sequence executed by the main controller 101 of the controller unit 100. This sequence is also started when mounting of the main tank 501 is detected like the tank replacement sequence executed by the print controller 202 described with reference to FIG. 10. The processing is executed by the main controller 101 using the RAM 106 as a work area in accordance with a program stored in the ROM 107 (see FIG. 2).

If the processing is started, the main controller 101 enters a waiting state for tank type information. The tank type information is the tank type information transmitted by the print controller 202 of the print engine unit 200 in S1001 of FIG. 10. After confirming receipt of the tank type information in S1101, the main controller 101 proceeds to S1102.

In S1102, the main controller 101 stores the received tank type information in the ROM 107 and performs tank compliance determination processing based on the stored tank type information. The main controller 101 then generates tank compliance information in which "compliance" or "noncompliance" is set for each of the four main tanks 501. "Compliance" indicates that the mounted main tank 501 conforms to the contract and "noncompliance" indicates that the mounted main tank 501 does not conform to the contract. The tank compliance determination processing will be described later in detail.

In S1103, the main controller 101 determines whether the tank compliance information on all the main tanks 501 is "compliance." If the tank compliance information on all the main tanks 501 is "compliance," the main controller 101 proceeds to S1104, sets the tank use allowance information to "use allowance," and transmits it to the print engine unit 200. Further, in S1105, if the printing apparatus 1 is in "error state," the main controller 101 removes it.

In contrast, if the tank compliance information on at least one of the tanks is "noncompliance" in S1103, the main controller 101 proceeds to S1106, sets the tank use allowance information to "use disallowance," and transmits it to the print engine unit 200. Further, in S1107, the main controller 101 sets the printing apparatus 1 to "error state" and displays a message that an inappropriate main tank 501 is mounted on the printing apparatus 1 on a display unit of the operating panel 104. The processing is thus finished.

The tank use allowance information transmitted by the main controller 101 in S1104 or S1106 corresponds to the information whose receipt is confirmed by the print controller 202 of the print engine unit 200 in S1003 of FIG. 10.

Figure 12:
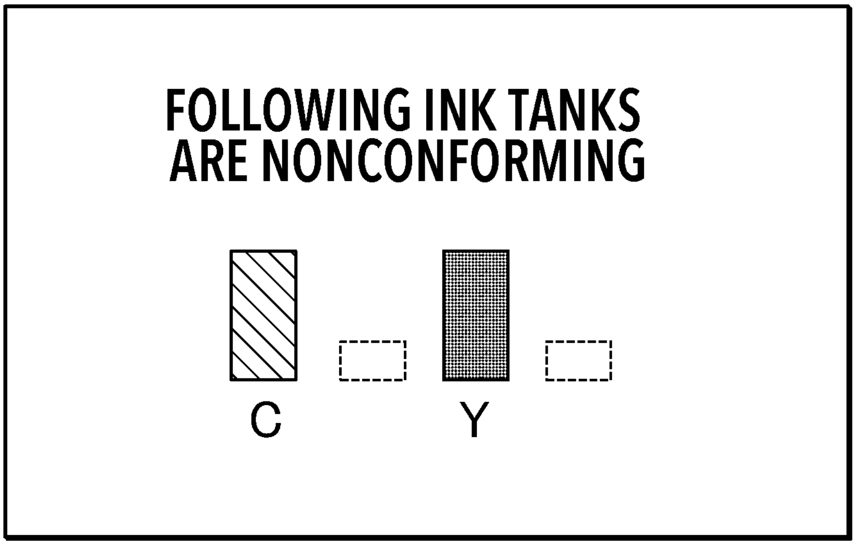
FIG. 12 is a diagram showing an example of a screen displayed on a display unit of an operating panel.

FIG. 12 is a diagram showing an example of a screen displayed on the display unit of the operating panel 104 in S1107 of FIG. 11. The main controller 101 provides a display based on the tank compliance information. This example shows a case where the tank compliance information on the main tanks 501 of cyan and yellow is "noncompliance." A user can see the displayed screen and confirm the conformance state of the main tanks 501 mounted on the printing apparatus 1. The screen may display recommendation to replace the mounted main tanks 501 with general tanks or conclude the contract.

As described above, if any one of the main tanks 501 mounted on the printing apparatus 1 of the present embodiment does not conform to the contract, "error state" is set and the sub tank refilling processing is performed for none of the main tanks 501. No print command is accepted and no print operation is performed unless "error state" is removed.

Figure 13:
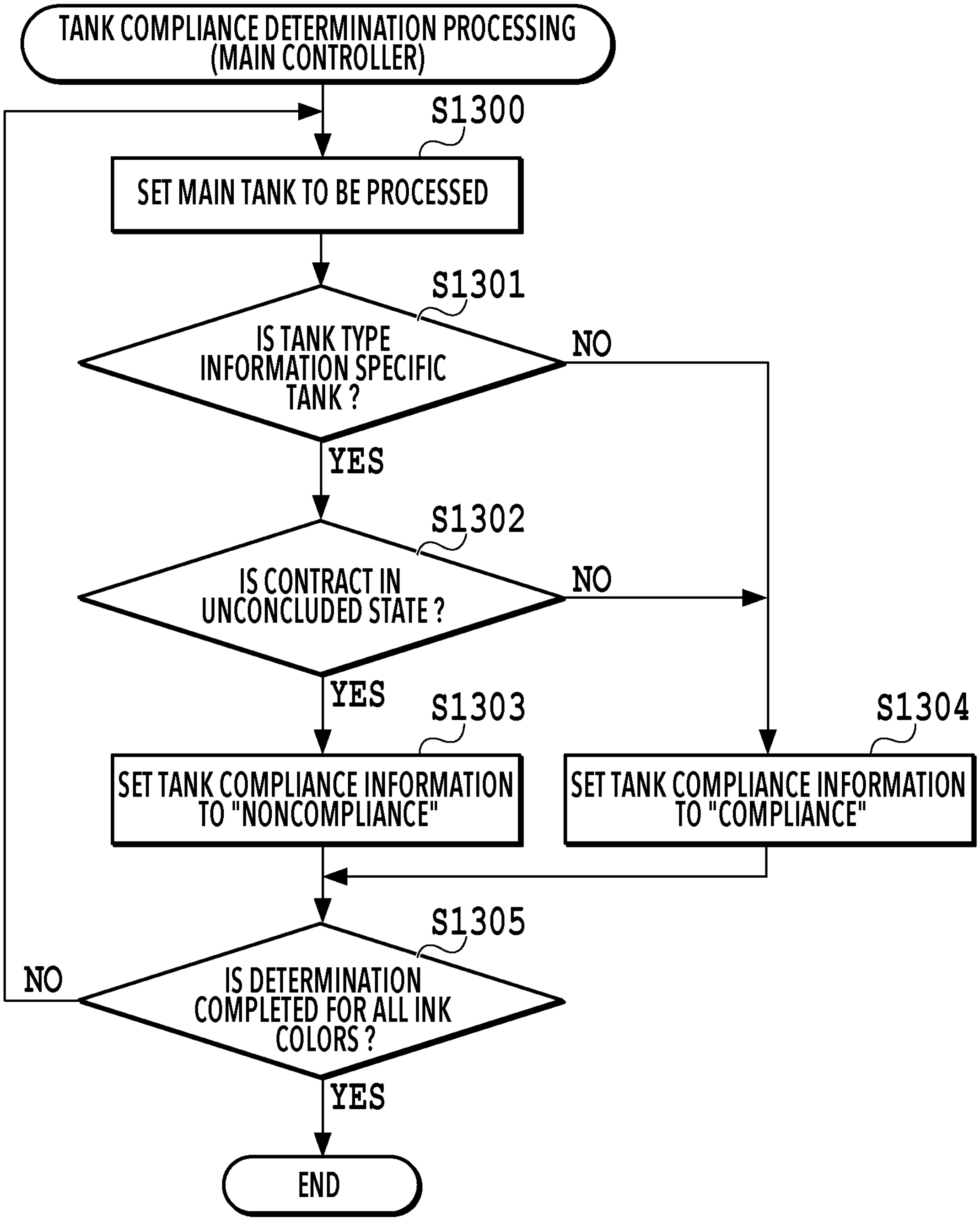
FIG. 13 is a flowchart showing tank compliance determination processing.

FIG. 13 is a flowchart showing the tank compliance determination processing performed by the main controller 101 in S1102 of FIG. 11. The processing is executed by the main controller 101 using the RAM 106 as a work area in accordance with a program stored in the ROM 107 (see FIG. 2).

If the processing is started, in S1300, the main controller 101 first sets a main tank 501 to be processed from among the mounted four main tanks 501. In 51301, the main controller 101 determines whether tank type information on an ink color to be processed indicates "specific tank." The main controller 101 proceeds to S1302 if the tank is a specific tank and proceeds to S1304 if the tank is not a specific tank but a general tank.

In S1302, the main controller 101 refers to the use contract information stored in the RAM 106 and determines whether the predetermined contract is in a concluded state or an unconcluded state. If the predetermined contract is in an unconcluded state, the main controller 101 proceeds to S1303 and sets the tank compliance information on the main tank 501 to be processed to "noncompliance." In contrast, if the predetermined contract is in a concluded state, the main controller 101 proceeds to S1304 and sets the tank compliance information on the main tank 501 to be processed to "compliance." The use contract information stored in the RAM 106 is acquired from the cloud server 450 (see FIG. 2) and updated as appropriate. A method of acquiring the use contract information from the cloud server 450 will be described later with reference to FIG. 14.

In S1305, the main controller 101 determines whether the tank compliance information is set for all the four main tanks 501. If the tank compliance information is not set for any of the main tanks 501, the main controller 101 returns to S1300 and sets the next main tank 501 to be processed. If the tank compliance information is set for all the main tanks 501, the processing is finished.

The printing apparatus 1 of the present embodiment manages in the ROM 107 a rewritable communication permission flag indicating permission (ON) or prohibition (OFF) of communication with the cloud server 450. The default of the communication permission flag is OFF (prohibition) and a user can switch the communication permission flag via the operating panel 104.

Figure 14:
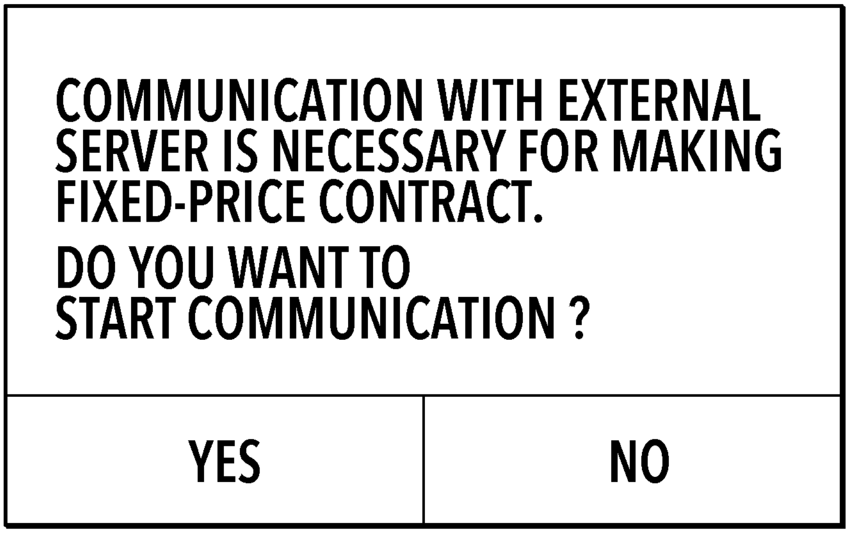
FIG. 14 is a diagram showing an example of a screen on the operating panel in the case of setting a communication permission flag.

FIG. 14 shows an example of a screen displayed on the operating panel 104 in the case of setting the communication permission flag. If a user pushes "YES," the main controller 101 updates the communication permission flag stored in the ROM 107 to permission (ON). Even if the communication permission flag is permission (ON), the main controller 101 switches the communication permission flag from permission (ON) to prohibition (OFF) in a case where an unconcluded state of the predetermined contract continues for a predetermined period.

Figure 15:
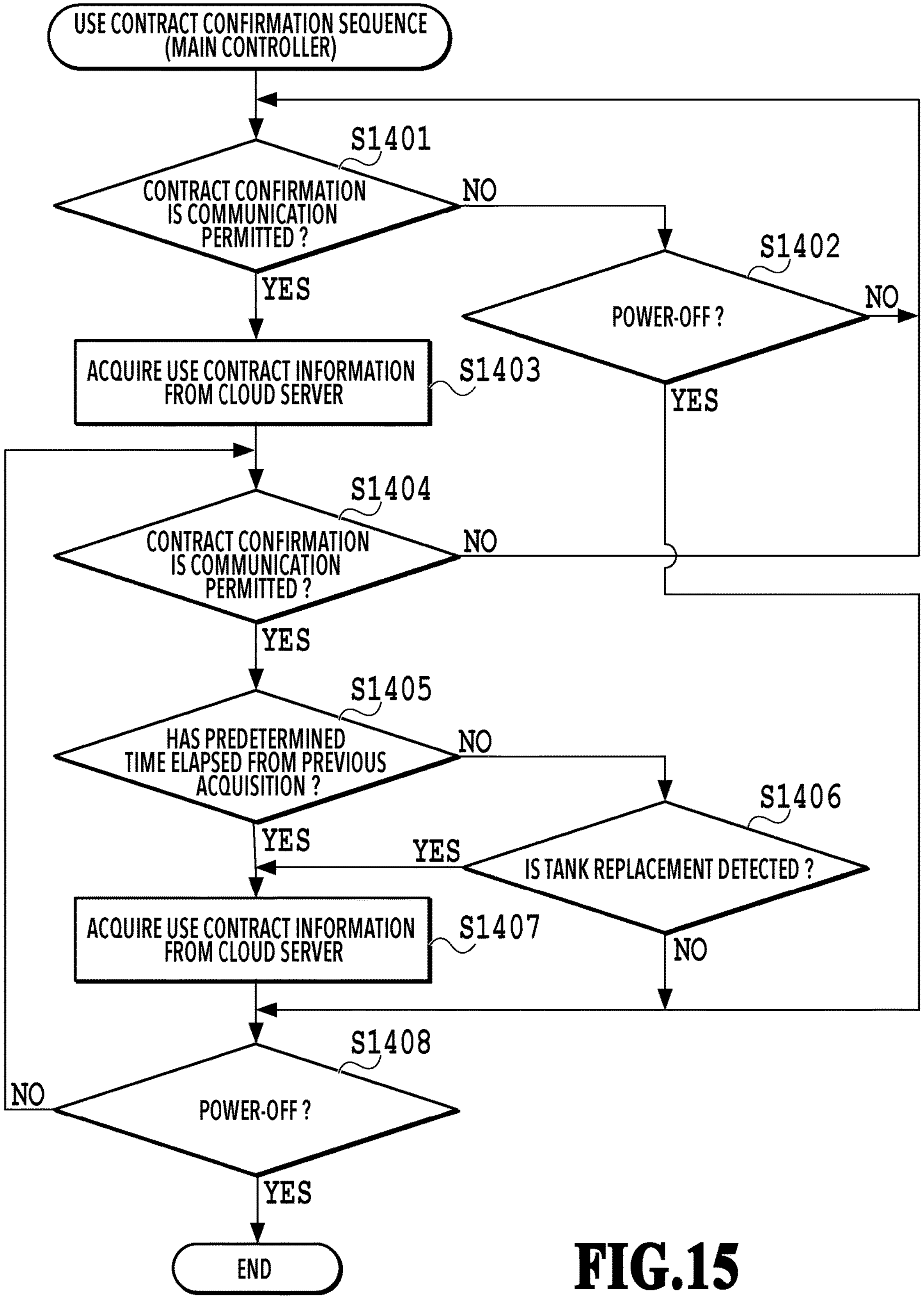
FIG. 15 is a flowchart showing a use contract confirmation sequence.

FIG. 15 is a flowchart showing a use contract confirmation sequence performed by the main controller 101. The processing is a sequence started at power-on of the printing apparatus 1 and regularly performed by the main controller 101 during power-on.

If the processing is started, in S1401, the main controller 101 first confirms the settings in the ROM 107 and determines which of permission and prohibition the communication permission flag is set to. If the flag is set to prohibition, the main controller 101 proceeds to S1402 and determines whether the printing apparatus 1 is powered off. The main controller 101 finishes the processing if the printing apparatus 1 is powered off and returns S1401 if the printing apparatus 1 is not powered off. The determination processing in S1401 and S1402 is repeated until the communication permission flag is determined to be ON or the printing apparatus 1 is powered off. In short, the processing in S1401 and S1402 is a routine regularly performed while the communication permission flag is OFF.

If the communication permission flag is determined to be permission in S1401, the main controller 101 proceeds to S1403, accesses the cloud server 450, and acquires use contract information.

In S1404, the main controller 101 determines whether the communication permission flag is permission. The main controller 101 returns to S1401 if the flag is prohibition and proceeds to S1405 if the flag is permission. Even though the communication permission flag is determined to be ON in S1401, if the contract has not been concluded, a predetermined time may elapse and the communication permission flag may be switched to OFF while the routine from S1404 to S1408 described below is performed. In this case, the main controller 101 returns to S1401 and performs the routine of S1401 and S1402.

In S1405, the main controller 101 determines whether a time that has elapsed from the acquisition of the use contract information from the cloud server 450 exceeds a threshold (such as 16 hours). If the elapsed time exceeds the threshold, there is a possibility that the use contract information has been updated. Thus, the main controller 101 proceeds to S1407 and acquires the latest use contract information from the cloud server 450.

In contrast, if the elapsed time is equal to or less than the threshold, the main controller 101 proceeds to S1406 and determines whether the replacement of the main tank 501 is detected. If the replacement of the main tank 501 is detected, the main controller 101 proceeds to S1407 and acquires the latest use contract information from the cloud server 450. If the replacement of the main tank 501 is not detected, the main controller 101 proceeds to S1408 without communicating with the cloud server 450.

In S1408, the main controller 101 determines whether the printing apparatus 1 is powered off. The main controller 101 returns to S1404 if the printing apparatus 1 is not powered off and finishes the processing if the printing apparatus 1 is powered off. As described above, the processing from S1404 to S1408 is a routine regularly performed while the communication permission flag is set to permission. However, in order to reduce the load on the cloud server, S1407 including communication with the cloud server is performed only at expiration of a predetermined interval (16 hours) or detection of replacement of the main tank 501.

Figure 16:
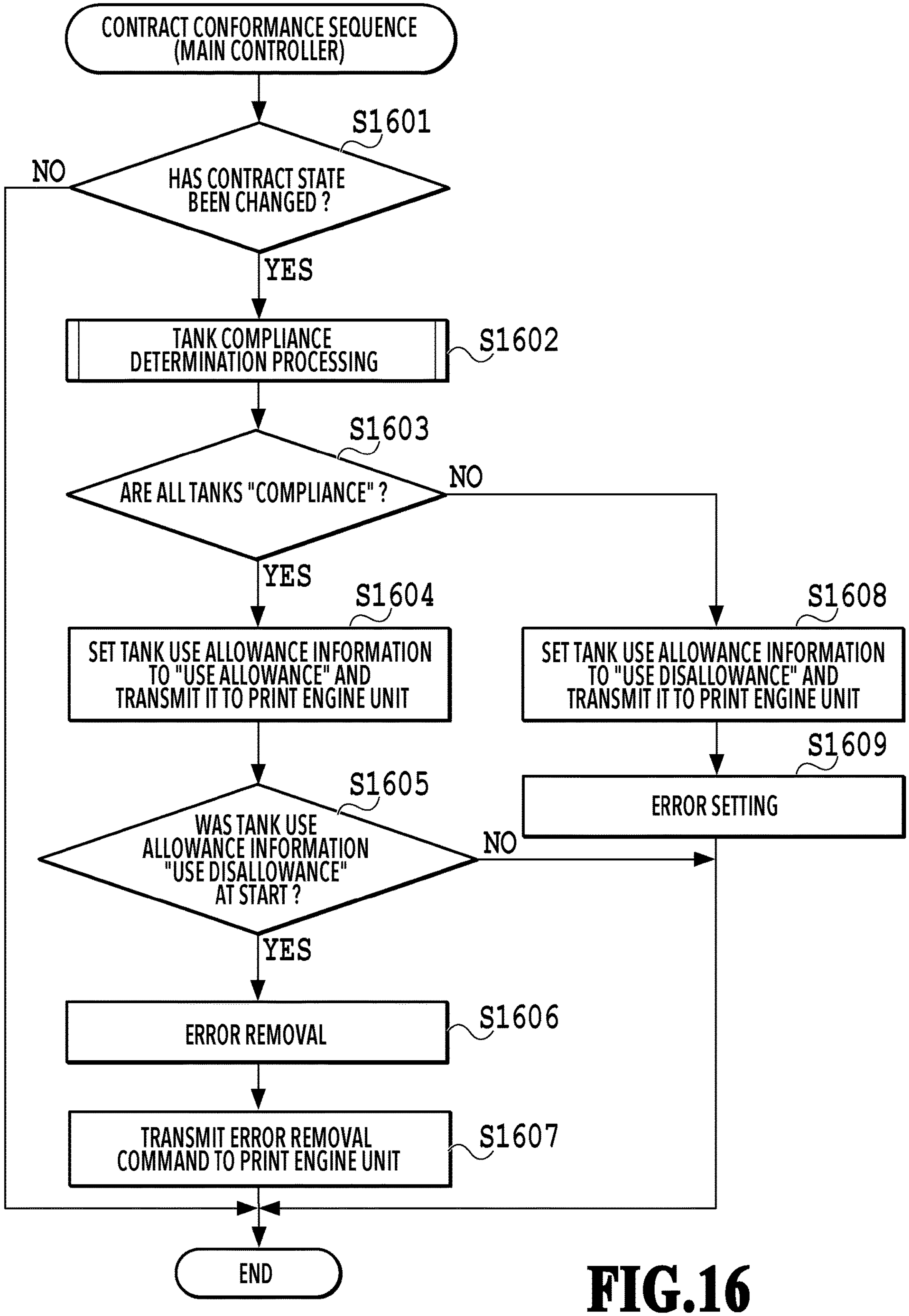
FIG. 16 is a flowchart showing a contract conformance sequence.

FIG. 16 is a flowchart showing a contract conformance sequence executed by the main controller 101 in a case where the use contract information is acquired. The processing is started at the time when the main controller 101 acquires the use contract information in S1403 or S1407 of FIG. 15. The processing is executed by the main controller 101 using the RAM 106 as a work area in accordance with a program stored in the ROM 107 (see FIG. 2).

If the processing is started, the main controller 101 determines in S1601 whether the currently acquired use contract information has been changed from the previously acquired use contract information. The main controller 101 proceeds to S1602 if the use contract information has been changed and finishes the processing if the use contract information has not been changed.

In S1602, the main controller 101 performs the tank compliance determination processing described with reference to the flowchart of FIG. 13 based on the acquired use contract information. At this time, as the tank type information to be a criterion of determination, the main controller 101 uses information stored in ROM 107 in the previous main tank replacement sequence described with reference to FIG. 11.

In S1603, the main controller 101 determines whether the tank compliance information on all the main tanks 501 is "compliance." If the tank compliance information on any of the main tanks 501 is "noncompliance," the main controller 101 proceeds to S1608, sets the tank use allowance information to "use disallowance," and transmits it to the print engine unit 200. Further, in S1609, the main controller 101 sets the printing apparatus 1 to "error state," displays a message that a noncompliant main tank 501 is mounted on the printing apparatus 1 on the display unit of the operating panel 104, and finishes the processing.

In contrast, if the tank compliance information on all the ink colors is determined to be "compliance" in S1603, the main controller 101 proceeds to S1604, sets the tank use allowance information to "use allowance," and transmits it to the print engine unit 200.

Further, in S1605, the main controller 101 determines whether the tank use allowance information was set to "use disallowance" at the start of the processing. If the tank use allowance information was not set to "use disallowance" at the start of the processing, the processing is finished. If the tank use allowance information was set to "use disallowance" at the start of the processing, the main controller 101 proceeds to S1606 and removes "error state" of the printing apparatus 1.

In S1607, the main controller 101 transmits an error removal command to the print engine unit 200. The processing is thus finished.

Figure 17:
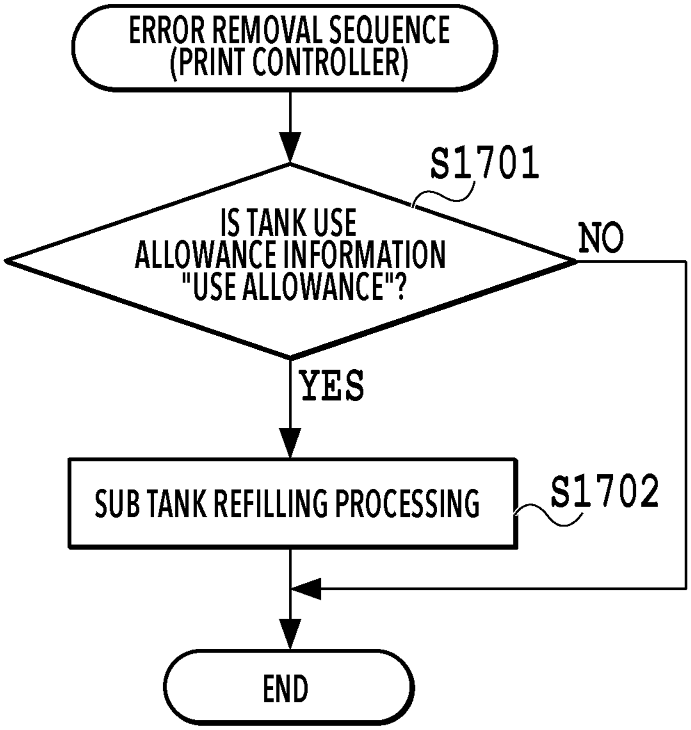
FIG. 17 is a flowchart showing an error removal sequence.

FIG. 17 is a flowchart showing an error removal sequence executed by the print controller 201. The processing is started when the print controller 202 receives the error removal command transmitted by the main controller 101. The processing is executed by the print controller 202 using the RAM 204 as a work area in accordance with a program stored in the ROM 203 (see FIG. 2).

If the processing is started, the print controller 202 determines whether the received tank use allowance information is set to "use allowance." If the tank use allowance information is not "use allowance," the processing is finished. If the tank use allowance information is "use allowance," the print controller 202 proceeds to S1702 and performs sub tank refilling processing. The sub tank refilling processing performed in S1702 is the same as the sub tank refilling processing performed in S1005 of FIG. 10. The processing is thus finished.

Here, a state where a specific tank is mounted on the printing apparatus 1 without conclusion of the predetermined contract will be considered. In this state, the printing apparatus 1 is in "error state" and neither the sub tank refilling processing nor the print operation is performed. To remove "error state," a user can adopt a method of replacing the mounted specific tank with a general tank or a method of concluding the unconcluded contract.

In the case of replacing the specific tank with a general tank, the tank replacement sequences described with reference to FIG. 10 and FIG. 11 are performed at the time when a user replaces the main tank 501. In this case, in S1102 of FIG. 11, the tank compliance information on all the main tanks 501 is set to "compliance." The tank use allowance information set to "use allowance" is transmitted to the print controller 202 in S1104 and "error state" is removed in S1105. After that, sub tank refilling processing is performed in S1005 of FIG. 10.

On the other hand, in the case of concluding the unconcluded contract, the contract conformance sequence described with reference to FIG. 16 is performed. In this case, in S1602, the tank compliance information on all the main tanks 501 is set to "compliance." In S1604, the tank use allowance information set to "use allowance" is transmitted to the print engine unit 200. Further, "error state" is removed in S1606 and an error removal command is transmitted to the print controller 202 in S1607. After that, sub tank refilling processing is performed in S1702 of FIG. 17.

According to the present embodiment described above, the ink refilling operation from the main tank to the sub tank is restricted in a case where a specific tank whose use is permitted only in a printing apparatus under the predetermined contract is mounted on a printing apparatus for which the predetermined contract has not been concluded. The restriction can be removed by replacing the specific tank with a general tank or concluding the predetermined contract. At this time, the ink refilling operation for the sub tank can be performed between the time of replacement of the specific tank with a general tank or conclusion of the predetermined contract and the time of actual issuance of a print command. That is, in the case of receiving an actual print command, the printing apparatus 1 can output a printed subject speedily without the need to perform the sub tank refilling processing prior to the print operation.

Second Embodiment

The printing apparatus 1 described with reference to FIG. 1 to FIG. 9 is used also in the present embodiment like the first embodiment.

Figure 18:
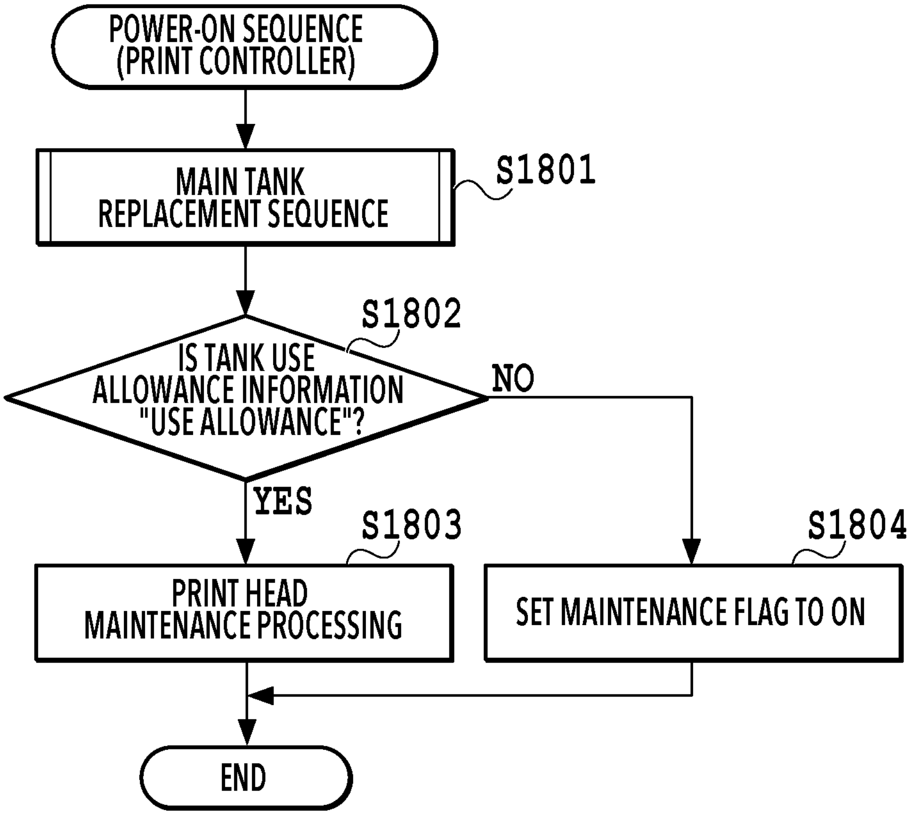
FIG. 18 is a flowchart showing a power-on sequence.

FIG. 18 shows a power-on sequence performed by the print controller 202 of the present embodiment when the printing apparatus 1 is powered on. The processing is executed by the print controller 202 using the RAM 204 as a work area in accordance with a program stored in the ROM 203 (see FIG. 2).

If the processing is started, in S1801, the print controller 202 first executes the main tank replacement sequence described with reference to FIG. 10. At this time, the main controller 101 also executes the main tank replacement sequence described with reference to FIG. 11 concurrently with S1801. That is, in S1801, the print controller 202 receives tank use allowance information at power-on from the main controller. If the use allowance information is "use allowance," sub tank refilling processing is also performed.

In S1802, the print controller 201 determines whether the tank use allowance information is "use allowance." If the tank use allowance information is "use allowance," the print controller 202 proceeds to S1803 and performs predetermined maintenance processing for the print head 8. More specifically, the print controller 202 performs the wiping processing and suction processing described with reference to FIG. 8 via the maintenance control unit 210.

In contrast, if the tank use allowance information is "use disallowance" in S1802, the print controller 201 proceeds to S1804 and sets a maintenance flag to ON (unexecuted). The processing is thus finished.

The maintenance flag will be briefly described. The maintenance flag is a flag that is set to ON in a case where maintenance processing is not performed at the time when the maintenance processing should usually be performed for the print head 8, for example, at power-on. The maintenance flag is managed in the ROM 107 and its default is set to OFF.

Figure 19:
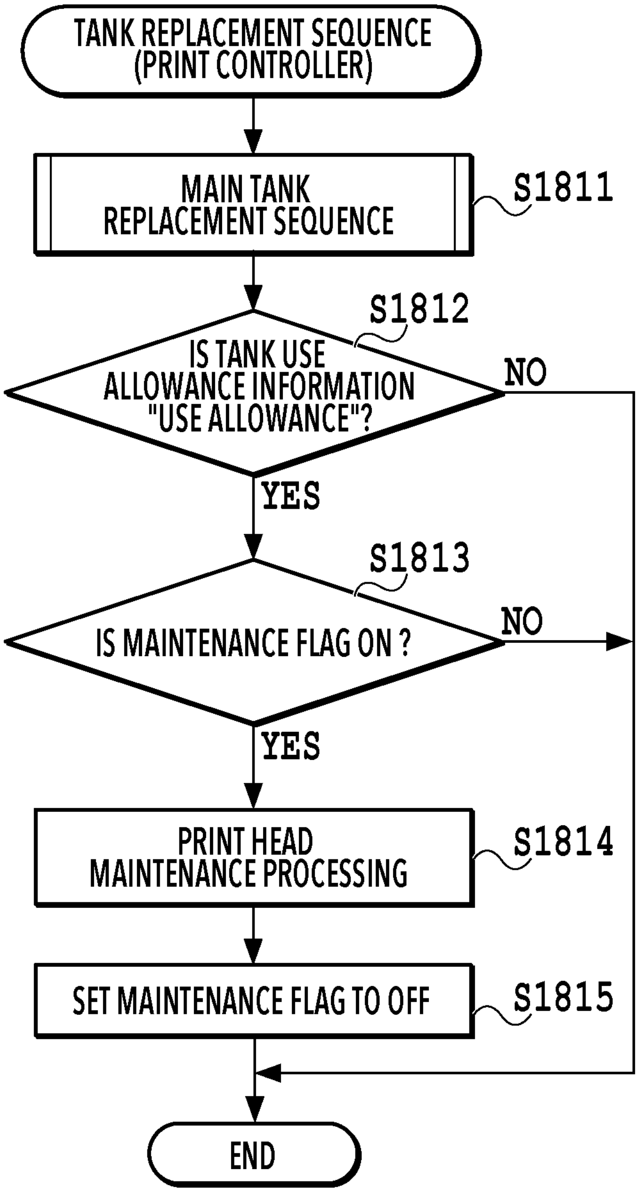
FIG. 19 is a flowchart showing a tank replacement sequence.

FIG. 19 is a flowchart showing a tank replacement sequence executed by the print controller 202 of the present embodiment. The processing is executed by the print controller 202 using the RAM 204 as a work area in accordance with a program stored in the ROM 203 (see FIG. 2). The sequence is started when mounting of the main tank 501 is detected in the printing apparatus 1.

If the processing is started, in S1811, the print controller 202 executes the main tank replacement sequence described with reference to FIG. 10. At this time, the main controller 101 also executes the main tank replacement sequence described with reference to FIG. 11 concurrently with S1811. That is, in S1811, the print controller 202 receives tank use allowance information at the time of replacement of the main tank from the main controller. If the use allowance information is "use allowance," sub tank refilling processing is also performed.

In S1812, the print controller 202 determines whether the tank use allowance information is "use allowance." If the tank use allowance information is "use disallowance," the print controller 202 finishes the processing without performing maintenance processing for the print head 8.

In contrast, if the tank use allowance information is "use allowance" in S1812, the print controller 201 proceeds to S1813 and determines whether the maintenance flag is ON (unexecuted). If the maintenance flag is ON (unexecuted), the print controller 202 proceeds to S1814. If the maintenance flag is OFF (executed), the processing is finished since no more maintenance processing is necessary.

In S1814, the print controller 2 performs predetermined maintenance processing. For example, even if the tank use allowance information was "use disallowance" and maintenance processing was not performed at power-on of the printing apparatus 1, maintenance processing is performed in S1814 in a case where a user replaces the main tank 501. The contents of the maintenance processing performed in S1814 may be the same as or different from those in S1803 of the power-on sequence.

In S1815, the print controller 202 sets the maintenance flag to OFF (executed). The processing is thus finished.

Figure 20:
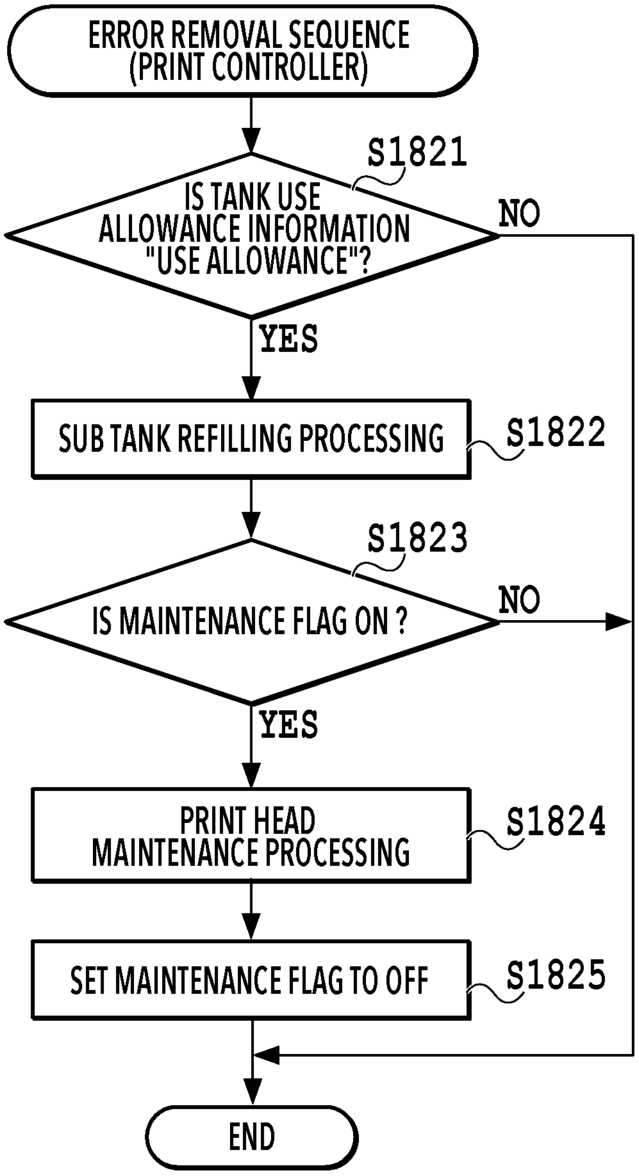
FIG. 20 is a flowchart showing an error removal sequence.

FIG. 20 is a flowchart showing an error removal sequence executed by the print controller 201. The processing is started in a case where the print controller 202 receives an error removal command transmitted by the main controller 101. The processing is executed by the print controller 202 using the RAM 204 as a work area in accordance with a program stored in the ROM 203 (see FIG. 2).

Since the processing in S1821 and S1822 is the same as that in the first embodiment described with reference to FIG. 17, the description thereof is omitted.

In S1823, the print controller 202 determines whether the maintenance flag is ON (unexecuted). If the maintenance flag is OFF (executed), the processing is finished since no more maintenance processing is necessary.

In contrast, if the maintenance flag is ON (unexecuted), the print controller 202 proceeds to S1824 and performs predetermined maintenance processing for the print head 8. For example, even if the tank use allowance information was "use disallowance" and maintenance processing was not performed at power-on of the printing apparatus 1, maintenance processing is performed in S1824 in a case where a user concludes the predetermined contract. The contents of the maintenance processing performed in S1824 may be the same as or different from those in S1803 or S1814.

In S1825, the print controller 202 sets the maintenance flag to OFF (executed). The processing is thus finished.

In general, at power-on of the printing apparatus 1 or at the time of replacement of the main tank 501, the print controller 202 refills the sub tank 502 with ink and performs the maintenance processing for the print head 8. In the first embodiment, the sub tank refilling processing is prevented in a case where a nonconforming main tank 501 is mounted. However, even though the sub tank refilling processing is prevented, if the maintenance processing for the print head 8 is performed, there is a possibility that ink is supplied from the main tank 501 to the sub tank 502 along with the maintenance processing. Therefore, in the present embodiment, not only the sub tank refilling processing but also the maintenance processing for the print head is prevented in a case where a nonconforming main tank 501 is mounted.

That is, according to the present embodiment described above, not only the sub tank refilling operation but also the maintenance processing for the print head is restricted in a case where a specific tank whose use is permitted only in a printing apparatus under the predetermined contract is mounted on a printing apparatus for which the predetermined contract has not been concluded. The restriction can be removed by replacing the specific tank with a general tank or concluding the predetermined contract. At this time, the ink refilling operation for the sub tank and the maintenance processing for the print head can be performed between the time of replacement of the specific tank with a general tank or conclusion of the predetermined contract and the time of actual receipt of a print command. That is, in the case of receiving an actual print command, the printing apparatus 1 can output a printed subject speedily without the need to perform the sub tank refilling processing or the maintenance processing for the print head prior to the print operation.

Third Embodiment

In the embodiments described above, the sub tank refilling processing is performed in response to the removal of the error state. However, in a case where a minimum amount of ink remains in the sub tank 502, the first print operation after error removal can be performed without the refilling operation. In other words, the sub tank refilling processing is not necessarily required at the time of error removal. In addition, it is adequately considered that the replacement of the main tank or the conclusion of the contract for error removal is performed immediately before issuance of a print command, which results in performing the refilling operation for the sub tank immediately before the print operation.

In consideration of the above, in the present embodiment, the sub tank refilling processing is not performed at the time of error removal in a case where a minimum amount or more of ink remains in every sub tank 502. More specifically, a first threshold suitable for ink circulation control and a second threshold that is a minimum amount necessary for print operation are set as the amounts of ink in the sub tank. In normal sub tank refilling processing, a sub tank is refilled with ink if the remaining amount of ink in the sub tank is less than the first threshold. On the other hand, at the time of error removal, the sub tank refilling processing is performed only in a case where the remaining amount of ink in any of the sub tanks 502 is less than the second threshold. In this case, the sub tank 502 may be refilled with ink until the amount of ink exceeds the second threshold.

This can reduce the number of times of sub tank refilling operation in response to error removal and the time required for the sub tank refilling operation, which leads to a reduction in downtime during which print operation cannot be performed. As a result, in the first print operation after error removal, a printed subject can be output in a shorter time than the embodiments described above.

Other Embodiments

In the above description, the processing for realizing the embodiments is performed through cooperation of the main controller 101 of the controller unit 100 and the print controller 202 of the print engine unit 200. However, the present invention is not limited to this form. The processing for realizing the embodiments may be performed collectively by one processor or may be performed through cooperation of three or more processors.

In the above description, the inkjet printing apparatus using ink as a consumable is taken as an example. However, the type of consumable and the printing method of the printing apparatus are not limited to this. For example, the present invention is also applicable to an electrophotographic printing apparatus using toner as a consumable. Further, the consumable is not limited to printing material such as ink or toner and the apparatus is not limited to a printing apparatus.

In the embodiments described above, the use contract information is managed by the cloud server 450 and acquired from the cloud server 450 by the main controller 101. However, the use contract information may be managed by a different means such as the ROM 107 of the controller unit 100. In this case, the allowance/disallowance of the sub tank refilling processing may be determined based on not a conclusion state of the predetermined contract but a different condition set by a user. For example, the sub tank refilling processing may be disallowed on a condition that a color main tank is mounted while the printing apparatus 1 is configured to output only monochrome images and may be allowed at the time of removal of the monochrome-only configuration.

In any case, the method described above works effectively provided that a buffer storing a consumable is interposed between a replaceable cartridge and a member that consumes the consumable and there is provided a cartridge whose use is permitted only in a case where a predetermined condition is satisfied.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-225535 filed Dec. 13, 2019, which is hereby incorporated by reference wherein in its entirety.

What is claimed is:

1. An image printing apparatus unit on which a tank storing ink is mountable, the image printing apparatus comprising:

a print head configured to eject ink based on print data;

a sub tank configured to receive ink from the mounted tank and to supply the ink to the print head; and a controller configured to, in a case where the mounted tank is a specific tank corresponding to a predetermined contract and the predetermined contract for the image printing apparatus has been concluded, control refilling of the sub tank with the ink from the mounted tank, wherein in a case where the mounted tank is the specific tank and the predetermined contract for the image printing apparatus has not been concluded, a printing using the ink stored in the mounted tank is not performed, and wherein the predetermined contract is a usage contract under which the use of the specific tank is permitted for a specified period on the image printing apparatus.

2. The image printing apparatus according to claim 1, further comprising a maintenance unit configured to perform maintenance processing for the print head, wherein in a case where the mounted tank is the specific tank and the predetermined contract for the image printing apparatus has been concluded, the maintenance unit is configured to perform the maintenance processing, and wherein in a case where the mounted tank is the specific tank and the predetermined contract for the image printing apparatus has not been concluded, the maintenance processing is not performed.

3. The image printing apparatus according to claim 1, wherein even in a case where the mounted tank is the specific tank and the predetermined contract for the image printing apparatus has been concluded, the controller controls not to refill the sub tank with the ink from the mounted tank in a case where an amount of ink stored in the sub tank is equal to or greater than a predetermined value.

4. The image printing apparatus according to claim 1, wherein the controller is configured to, in a case where the mounted tank is changed from the specific tank to a general tank and the predetermined contract for the image printing apparatus has not been concluded, control refilling of the sub tank with ink from the general tank.

5. The image printing apparatus according to claim 1, further comprising an acquisition unit configured to acquire information on a conclusion state of the predetermined contract from a server.

6. The image printing apparatus according to claim 1, further comprising a change unit configured to change a conclusion state of the predetermined contract.

7. The image printing apparatus according to claim 1, wherein a plurality of tanks are mountable on the image printing apparatus, and in a case where at least one of tanks mounted on the image printing apparatus is the specific tank and the predetermined contract for the image printing apparatus has not been concluded, a printing using ink stored in any of the tanks is not performed.

8. The image printing apparatus according to claim 1, further comprising a circulation unit configured to circulate ink between the sub tank and the print head while the print head performs print operation.

9. A control method of an image printing apparatus, wherein a tank storing ink is mountable on the image printing apparatus, and wherein the image printing apparatus comprises:

a print head configured to eject ink based on print data; and a sub tank configured to receive ink from the tank and supply the ink to the print head;

the control method comprising:

in a case where the mounted tank is a specific tank corresponding to a predetermined contract and the predetermined contract for the image printing apparatus has been concluded, refilling of the sub tank with the ink from the mounted tank, in a case where the mounted tank is the specific tank and the predetermined contract for the image printing apparatus has not been concluded, a printing using the ink stored in the mounted tank is not performed, and wherein the predetermined contract is a usage contract under which the use of the specific tank is permitted for a specified period on the image printing apparatus.

* * * * *